US012646293B2

(12) United States Patent
Nagarkatti et al.

(10) Patent No.: US 12,646,293 B2
(45) Date of Patent: Jun. 2, 2026

(54) METHODS AND SYSTEMS FOR PARTICLE CLASSIFICATION

(71) Applicant: Regeneron Pharmaceuticals, Inc., Tarrytown, NY (US)

(72) Inventors: Aslam Nagarkatti, Skillman, NJ (US); Shiva Naveen Ravi, Dublin, CA (US); Kaushik Krishna Pradeep, Montvale, NJ (US); Qingyan Hu, Millwood, NY (US); Marco Hernandez, New York, NY (US); Robert McCowan, Katonah, NY (US)

(73) Assignee: Regeneron Pharmaceuticals, Inc.

( * ) Notice: Subject to any disclaimer, the term of this patent is extended or adjusted under 35 U.S.C. 154(b) by 632 days.

(21) Appl. No.: 18/065,364

(22) Filed: Dec. 13, 2022

(65) Prior Publication Data

US 2023/0186610 A1 Jun. 15, 2023

Related U.S. Application Data

(60) Provisional application No. 63/341,775, filed on May 13, 2022, provisional application No. 63/289,489, filed on Dec. 14, 2021.

(51) Int. Cl.
*G06V 10/774* (2022.01)
*G06V 10/764* (2022.01)
(Continued)

(52) U.S. Cl.
CPC .......... *G06V 10/774* (2022.01); *G06V 10/764* (2022.01); *G06V 10/82* (2022.01); *G06V 20/698* (2022.01); *G06V 2201/10* (2022.01)

(58) Field of Classification Search
CPC .... G06V 10/774; G06V 10/764; G06V 10/82; G06V 20/698; G06V 2201/10;
(Continued)

(56) References Cited

U.S. PATENT DOCUMENTS

| 11,151,356 B2 * | 10/2021 | Flanagan | ............... G06N 3/045 |
| 2021/0303818 A1 * | 9/2021 | Randolph | ............ G01N 15/147 |

(Continued)

OTHER PUBLICATIONS

Wu, Haibing, and Xiaodong Gu. "Towards dropout training for convolutional neural networks." Neural Networks 71 (2015): 1-10. (Year: 2015).*

(Continued)

*Primary Examiner* — Stephen R Koziol
*Assistant Examiner* — Joshua Chen
(74) *Attorney, Agent, or Firm* — Smith Baluch LLP

(57) ABSTRACT

Methods and systems for particle classification are provided herein. A plurality of images of fluids/samples of pharmaceutical products, drugs, medicines, etc., may be analyzed using one or more machine learning models. The one or more machine learning models may comprise, for example, a convolution neural network. The one or more machine learning models may identify and classify one or more sub-visible particles in each image. The one or more one or more sub-visible particles may comprise, for example, cells, pathogens, protein aggregates, silicon oil droplets, fibers, air bubbles, glass particles, a combination thereof, and/or the like.

20 Claims, 20 Drawing Sheets

(51) Int. Cl.
  *G06V 10/82* (2022.01)
  *G06V 20/69* (2022.01)

(58) Field of Classification Search
  CPC ...... G06V 20/69; G06V 10/454; G06V 10/26;
  G06V 2201/122; G06N 3/0464
  See application file for complete search history.

(56) References Cited

U.S. PATENT DOCUMENTS

2023/0386176 A1* 11/2023 Mahé ..................... G06V 10/24
2025/0131749 A1* 4/2025 Middlestead .......... G06V 10/25

OTHER PUBLICATIONS

Calderon, Christopher P., Austin L. Daniels, and Theodore W. Randolph. "Using deep convolutional neural networks to circumvent morphological feature specification when classifying subvisible protein aggregates from micro-flow images." arXiv preprint arXiv: 1709.00152 (2017). (Year: 2017).*

Umar, Muhammad, et al. "Towards quantification and differentiation of protein aggregates and silicone oil droplets in the low micrometer and submicrometer size range by using oil-immersion flow imaging microscopy and convolutional neural networks." EJPB 169 (2021): 97-102 (Year: 2021).*

Search Report and Written Opinion mailed on Apr. 19, 2023 from the International Searching Authority in PCT/US2022/081461 filed Dec. 13, 2022 (9 pages).

Newby et al. "Convolutional neural networks automate detection for tracking of submicron-scale particles in 2D and 3D." Proceedings of the National Academy of Sciences 115.36 (2018): 9026-9031.

Umar, et al. "Towards quantification and differentiation of protein aggregates and silicone oil droplets in the low micrometer and submicrometer size range by using oil-immersion flow imaging microscopy and convolutional neural networks." European Journal of Pharmaceutics and Biopharmaceutics 169 (2021): 97-102.

* cited by examiner

FIG. 3A                              FIG. 3B
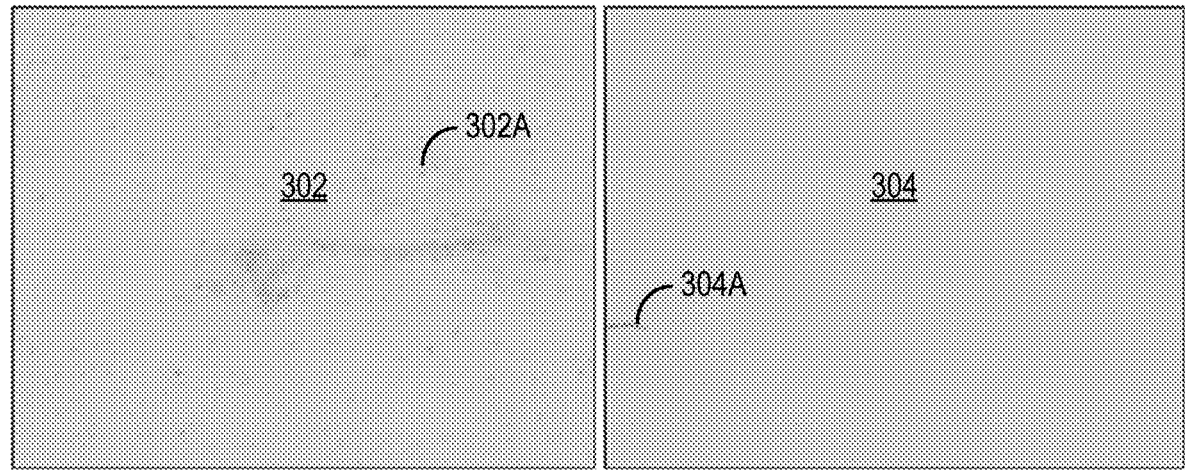

Silicon

| Particle ECD Size | Full Set | Train Set (80%) | Test Set (20%) |
|---|---|---|---|
| Very Small (<2uM) | 3920 | 3146 | 774 |
| Small (>=2uM,<10uM) | 3526 | 2814 | 712 |
| Medium (>=10uM <25uM) | 54 | 40 | 14 |
| Large (>=25uM) | 0 | 0 | 0 |
|  | 7500 | 6000 | 1500 |

Protein

| Particle ECD Size | Full Set | Train Set (80%) | Test Set (20%) |
|---|---|---|---|
| Very Small (<2uM) | 3017 | 2416 | 601 |
| Small (>=2uM,<10uM) | 3991 | 3194 | 797 |
| Medium (>=10uM, <25uM) | 435 | 346 | 89 |
| Large (>=25uM) | 57 | 44 | 13 |
|  | 7500 | 6000 | 1500 |

FIG. 11

| Experiment Title | Batch Size | Dropout Rate | Activation Function | Cross-Validation Score |
|---|---|---|---|---|
| 2.4.1 | 64 | 0.1 | ReLU | 0.846 |
| 2.4.2 | 64 | 0.15 | ReLU | 0.61 |
| 2.4.3 | 64 | 0.2 | ReLU | 0.624 |
| 2.4.4 | 128 | 0.1 | ReLU | 0.721 |
| 2.4.5 | 128 | 0.15 | ReLU | 0.937 |
| 2.4.6 | 128 | 0.2 | ReLU | 0.613 |
| 2.4.7 | 64 | 0.1 | Tanh | 0.167 |
| 2.4.8 | 64 | 0.15 | Tanh | 0.219 |
| 2.4.9 | 64 | 0.2 | Tanh | 0.167 |
| 2.4.10 | 128 | 0.1 | Tanh | 0.419 |
| 2.4.11 | 128 | 0.15 | Tanh | 0.167 |
| 2.4.12 | 128 | 0.2 | Tanh | 0.171 |

FIG. 14A

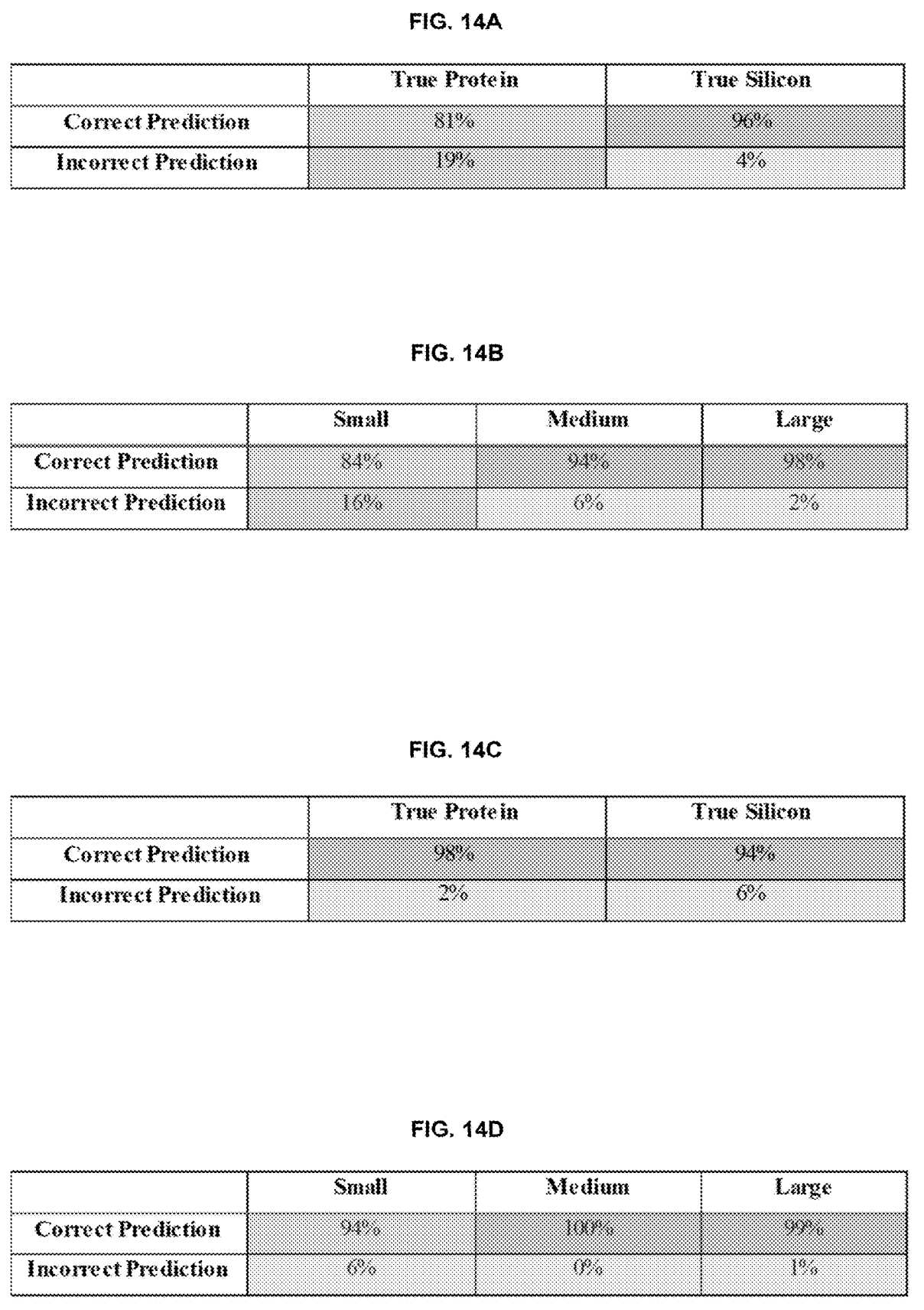

|  | True Protein | True Silicon |
|---|---|---|
| Correct Prediction | 81% | 96% |
| Incorrect Prediction | 19% | 4% |

FIG. 14B

|  | Small | Medium | Large |
|---|---|---|---|
| Correct Prediction | 84% | 94% | 98% |
| Incorrect Prediction | 16% | 6% | 2% |

FIG. 14C

|  | True Protein | True Silicon |
|---|---|---|
| Correct Prediction | 98% | 94% |
| Incorrect Prediction | 2% | 6% |

FIG. 14D

|  | Small | Medium | Large |
|---|---|---|---|
| Correct Prediction | 94% | 100% | 99% |
| Incorrect Prediction | 6% | 0% | 1% |

1800

1810

RECEIVE TRAINING DATA

1820

GENERATE A PLURALITY OF TRAINING IMAGES

1830

TRAIN A CONVOLUTIONAL NEURAL NETWORK

1900

1910

RECEIVE AT LEAST ONE INPUT IMAGE
COMPRISING AT LEAST ONE SUB-VISIBLE PARTICLE (SVP)

1920

GENERATE AT LEAST ONE PREPROCESSED IMAGE

1930

DETERMINE A CLASSIFICATION OF THE AT LEAST ONE SVP

1940

OUTPUT AN INDICATION OF THE CLASSIFICATION
OF THE AT LEAST ONE SVP

METHODS AND SYSTEMS FOR PARTICLE CLASSIFICATION

CROSS-REFERENCE TO RELATED PATENT APPLICATIONS

This application claims the benefit of, and priority to, U.S. Provisional Patent Application No. 63/289,489, filed on Dec. 14, 2021, and U.S. Provisional Patent Application No. 63/341,775, filed on May 13, 2022, both of which are hereby incorporated by reference in their entireties herein.

BACKGROUND

Monitoring of sub-visible particles (SVPs) in pharmaceutical products is critical due to the immunogenicity of certain SVP types. The presence of SVPs in pharmaceutical products may negatively impact clinical performance as well as patient safety, as certain SVPs may represent aggregates of thousands, to millions, of molecules. Existing methods and systems do not efficiently identify certain types and sizes of SVPs in pharmaceutical products. These and other considerations are discussed herein.

SUMMARY

It is to be understood that both the following general description and the following detailed description are exemplary and explanatory only and are not restrictive. Described herein are methods and systems for particle classification. These methods and systems may be used to detect and classify sub-visible particles ("SVPs") that may be present in a range of pharmaceutical products (e.g., drugs, medicines, antibody formulations, etc.). For example, one or more images of a sample of a pharmaceutical product may be captured by a flow imaging microscopy ("FIM") system. The FIM system may detect any SVPs that are present within the sample. The FIM system may generate metadata indicating a location of each detected SVP in the one or more images. Additionally, or in the alternative, another system or device may detect the SVPs (e.g., using a segmentation algorithm(s)).

The one or more images may be analyzed using a machine learning model(s). (e.g., a classifier). The machine learning model(s) may comprise a convolution neural network (CNN). The CNN may receive the one or more images (and optionally the metadata as well) as input and classify each SVP in the one or more images. The CNN may classify each SVP according to size, type, etc. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

FIG. 3A shows an example image;
FIG. 3B shows an example image.

FIG. 10 shows an example table;
FIG. 11 shows an example table;
FIG. 14A shows an example table;
FIG. 14B shows an example table;
FIG. 14C shows an example table;
FIG. 14D shows an example table.

DETAILED DESCRIPTION

Figure 1:
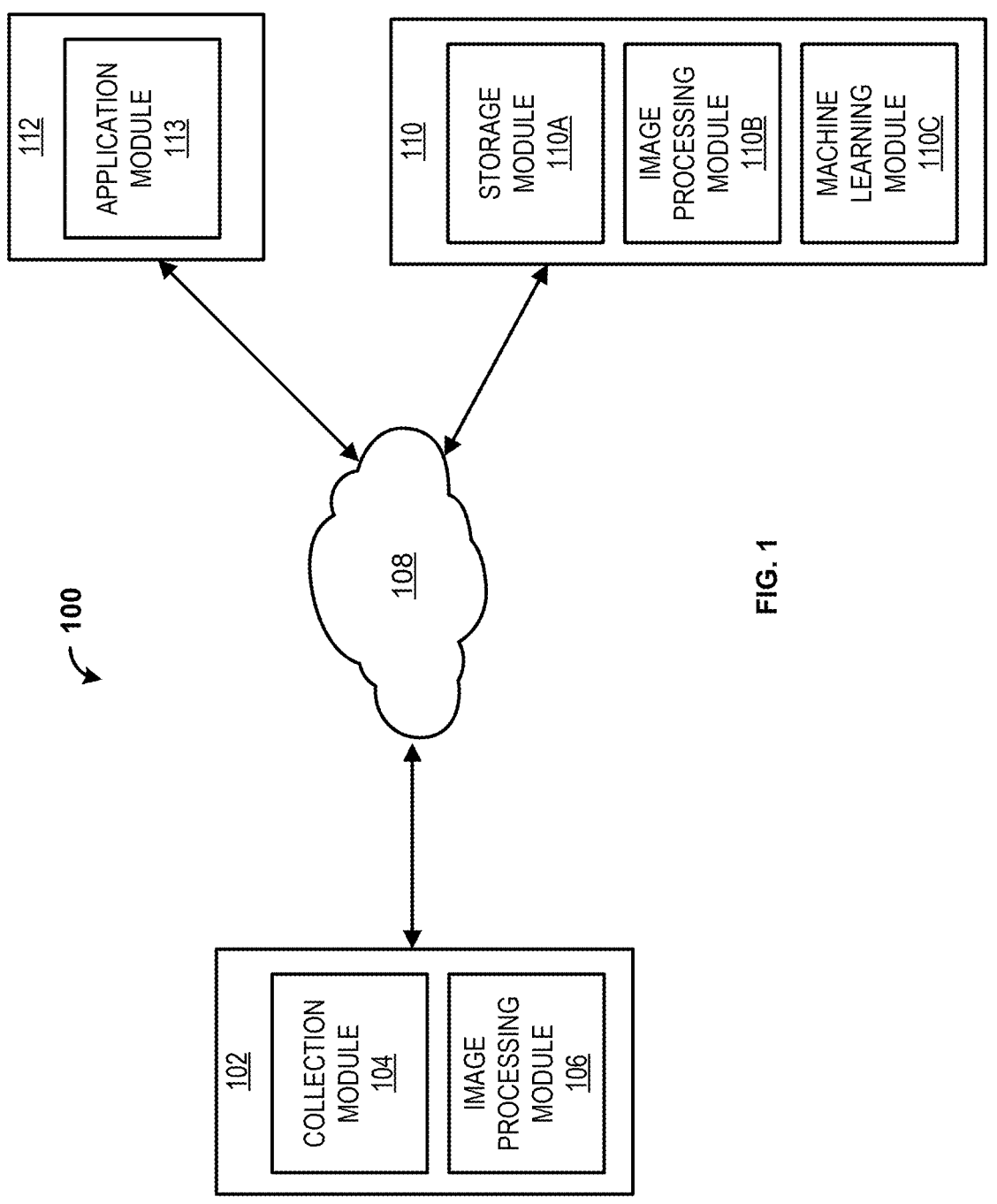
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage de-vices, magnetic storage devices, memristors, Non-Volatile Random Access Memory (NVRAM), flash memory, or a combination thereof.

Throughout this application reference is made to block diagrams and flowcharts. It will be under-stood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implement-ing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods and systems for particle classification are described herein. The present methods and systems may combine high-throughput flow imaging technology and machine learning for a variety of medical and pharmaceutical applications. Such applications include detection and classification of contaminants and/or unexpected particles in images of fluids/samples of pharmaceuticals products (e.g., drugs, medicines, antibody formulations, etc.). The images may be received from a flow imaging microscopy ("FIM") system. The images may be analyzed using one or more machine learning models, such as one or more convolutional neural networks (CNNs).

The images (hereinafter "FIM images") may comprise a range of sizes and types of sub-visible particles ("SVPs") that may not be observable unaided (e.g., without aid of a microscope or other instrument). Example SVPs include, but are not limited to, cells, pathogens, protein aggregates, silicon oil droplets, fibers, air bubbles, glass particles, a combination thereof, and/or the like. A presence of SVPs in pharmaceutical products may be undesirable for efficacy, safety, standardization, and so forth. Accordingly, the present methods and systems may detect and classify SVPs that may be present in pharmaceutical products.

Each SVP in each FIM image may be classified using the one or more machine learning models. The FIM images may be associated with metadata indicating a location of each unclassified particle in each FIM image, potentially including non-SVPs. The metadata may have been generated by the FIM system that captured the FIM images. Additionally, or in the alternative, another system or device may detect particles in the FIM images (e.g., using a segmentation algorithm(s)). For example, the location of each particle in each FIM image may be determined using one or more image segmentation algorithms.

Each unclassified particle in the FIM images may be initially classified by the one or more machine learning models as being an SVP (or a specific SVP type) or a non-SVP. Additionally, or in the alternative, the initial classification and/or location of each SVP and/or each non-SVP in each FIM image may be indicated by the metadata. Non-SVPs in the FIM images may be disregarded, while SVPs in the FIM images may be further classified according to size and/or type. For example, each of the SVPs may be classified based on its equivalent circular diameter (ECD) size. The SVPs may be further classified by the one or more machine learning models according to a plurality of features for each of a plurality of SVP types. For example, the one or more machine learning models may be trained to classify at least one SVP based on one or more features of an FIM image that are indicative of a particular type of SVP (e.g., features indicative of protein particles).

The one or more machine learning models may comprise a CNN. The CNN may comprise at least one filter that may be applied to each FIM image. The at least one filter may comprise, for example, a size of 3×3 pixels. In some examples, each FIM image—for training and/or for testing—may be preprocessed prior to being provided to the CNN. For example, each FIM image may be resized to a uniform size, such as 64×64 pixels. Other examples are possible as well. The at least one filter may be applied by the CNN to each resized FIM image.

The CNN may comprise a plurality of hyperparameters and at least one activation function for each hidden layer. The plurality of hyperparameters may comprise, for example, a batch size, a dropout rate, a number of epochs, kernel size, strides, paddings, etc. The at least one activation function may comprise, for example, a rectified linear units activation function or a hyperbolic tangent activation function. Other examples are possible as well.

The CNN may be trained using a training dataset. The training dataset may comprise a plurality of FIM images and corresponding metadata. This corresponding metadata may be indicative of an initial classification (e.g., SVP or non-SVP, SVP Type A or SVP Type B, etc.) and/or a location of each particle in each FIM image. It is to be understood that, in some examples, the CNN may be trained without the corresponding metadata (e.g., using the plurality of FIM images only). The location of at least one particle in each FIM image may also be determined by one or more image segmentation algorithms (e.g. agglomerative clustering, watershed transformation, etc.) used by the CNN and/or another model. The plurality of FIM images in the training dataset may comprise a plurality of SVP types and/or sizes. In some examples, each FIM image in the training dataset may comprise only one SVP and/or only one SVP type and/or only one SVP size. In other examples, each FIM image in the training dataset may comprise a plurality of SVPs and/or a plurality of SVP types and/or a plurality of SVP sizes. The at least one filter may be applied to each FIM image in the training dataset by the CNN to determine a plurality of features that correspond to each of a plurality of SVP types. Before training on the training dataset, at least one parameter of the CNN may be initialized with a value of that at least one parameter associated with another CNN(s) that was trained on another training dataset (e.g., "transfer learning").

The CNN may be tested using a testing dataset. The testing dataset may comprise a plurality of FIM images and corresponding metadata. This corresponding metadata may be indicative of an initial classification (e.g., SVP or non-SVP, SVP Type A or SVP Type B, etc.) and/or a location of each particle in each FIM image. It is to be understood that, in some examples, the CNN may be tested without the corresponding metadata (e.g., using the plurality of FIM images only). The location of at least one particle in each FIM image may also be determined by one or more image segmentation algorithms (e.g. agglomerative clustering, watershed transformation, etc.) used by the CNN and/or another model. The plurality of FIM images in the testing dataset may comprise a plurality of SVP types and/or sizes, which may or may not differ from the types and/or sizes in the training dataset. In some examples, each FIM image in the testing dataset may comprise only one SVP and/or only one SVP type and/or only one SVP size. In other examples, each FIM image in the testing dataset may comprise a plurality of SVPs and/or a plurality of SVP types and/or a plurality of SVP sizes.

The CNN may classify each SVP in each FIM image in the testing dataset. For example, the at least one filter may be applied to each FIM image in the testing dataset at each layer of the CNN. The CNN may classify at least one SVP in each FIM image in the testing dataset based on one or more features that are indicative of a type of the at least one SVP. The classification may comprise a binary classification, such as "protein or not protein," "silicon or not silicon," "protein or fiber," etc., or a multi-class classification, such as "silicon, or air bubble, or glass shard," etc. The classification may comprise a score or a level of confidence that the at least one SVP is a particular type (e.g., 90% confidence that the at least one SVP is a protein particle). Other examples are possible as well.

Turning now to FIG. 1, an example system 100 for particle classification is shown. The system 100 may comprise a computing device 102, which may be part of a flow imaging microscopy ("FIM") system. The computing device 102 may comprise a collection module 104 and an image processing module 106. The collection module 104 may comprise an imaging device, such as a camera and/or microscope configured for flow imaging microscopy, a still-image camera, a video camera, an infrared camera, an optical sensor(s), a combination thereof, and/or the like. The computing device 102 may be communication with a client device 112 and/or a server 110 via a network 106. In some examples, the client device 112 and the server 110 may be a single device (not shown). The network 106 may be configured to use a variety of network paths, protocols, devices, and/or the like for communication. The network 106 may have a plurality of communication links connecting each of the device shown in the system 100. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The client device 112 may comprise a computing device (s), a mobile device(s), a smart device(s), a combination thereof, and/or the like. The server 110 may comprise one or more computing devices comprising a storage module 110A (e.g., a storage medium(s)), an imaging processing module 110B, and a machine learning module 110C. The client device 112 may comprise an application module 113 configured to communicate with and/or control aspects of the server 110. For example, the application module 113 may be configured to cause the server 110 (and modules thereof) to perform the steps and processes described herein.

The system 100 may be configured for classification of sub-visible particles ("SVPs"). As used herein, the term "particle" means any portion of a substance or material, such as a protein or silicon aggregate, dust, mold spores, cells, groups of cells, fibers, small chunks of materials, organism (s), tissue, biological matter, minerals, air bubbles, glass shards, a combination thereof, and/or the like. The computing device 102 may use high-throughput flow imaging technology to capture images of samples/fluids comprising SVPs via the collection module 104 and the image processing module 106. For example, the computing device 102 may be configured to capture images of samples/fluids that may be pumped through a flow-cell of the FIM system (not shown). In some examples, the collection module 104 may comprise a digital microscope that may capture images comprising particles within the samples/fluids. The collection module 104 may capture successive images/frames of each sample/fluid as it flows through the flow-cell (not shown).

The samples/fluids may comprise pharmaceutical products (e.g., drugs, medicines, antibody formulations, etc.). Such images (hereinafter "FIM images") may comprise a range of types of SVPs that may not be observable unaided (e.g., without aid of a microscope or other instrument). Example SVPs include, but are not limited to, cells, pathogens, protein aggregates, silicon oil, fibers, air bubbles, glass particles, a combination thereof, and/or the like. A presence of SVPs in pharmaceutical products may be undesirable for efficacy, safety, standardization, and so forth. Accordingly, the system 100 may be configured to detect and classify SVPs in FIM images.

FIM images captured by the collection module 104 of the computing device 102 may be appended with metadata (or separate metadata may be generated) by the image processing module 106. For example, the image processing module 106 may append to the FIM images (or separately generate) metadata indicating a number of particles in each FIM image, potentially including non-SVPs, and/or an indication of each location of each particle in each FIM image. The FIM images and the metadata may be sent to the server 110 via the network 108 for storage. For example, the computing device 102 may send the FIM images and the metadata to the storage module 110A of the server 110 for storage. As further described herein, the client device 112 may cause the machine learning module 110C of the server 110 to classify SVPs in the FIM images based on, for example, the FIM images themselves and the associated metadata.

Figure 2:
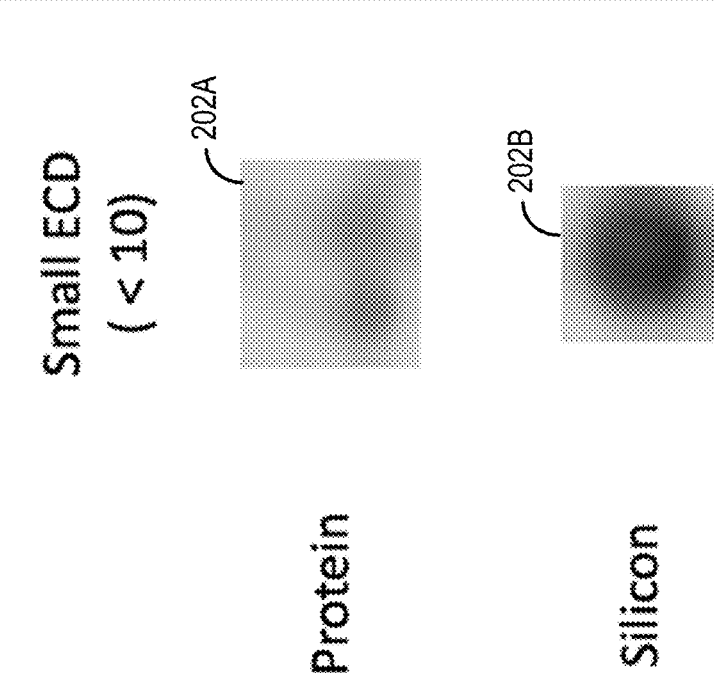
FIG. 2 shows example sub-visible particles.

Turning now to FIG. 2, example images 202A, 202B, 204A, 204B, 206A, 206B depicting protein and silicon SVPs of various sizes are shown. SVPs may be categorized based on their equivalent circular diameter (ECD) size. The ECD of an SVP may be measured, for example, in micrometers (m). The ECD of SVPs depicted in FIM images described herein may range, for example, from approximately 1.125 μm to over 130 m. Example ECD sizes may include: very small ECD (<2 m) (not shown), small ECD (>=2 m and <10 m) (202A, 202B), medium ECD (>=10 m and <=25 m) (204A, 204B), and large ECD (>=25 m) (206A, 206B). Other example sizes are possible as well.

As further described herein, the client device 112 may cause the machine learning module 110C of the server 110 to classify SVPs in FIM images based on, for example, the FIM images themselves and the associated metadata. It is to be understood that, in some examples, the machine learning module 110C may classify SVPs in FIM images without the corresponding metadata (e.g., using the FIM images only). For purposes of explanation, the description herein will describe the imaging processing module 110B of the server 110 as the module that receives and analyzes the FIM images; however, it is to be understood that the image processing module 106 may similarly receive and process any of the FIM images captured by the computing device 102.

The machine learning module 110C may comprise one or more machine learning models, artificial intelligence models, a combination thereof, and/or the like. For example, the machine learning module 110C may use, or comprise, a convolutional neural network, an image classification model, a segmentation model, statistical algorithm(s), etc. In some examples, the machine learning module 110C (or another module or device of the system 100) may classify any particle in an FIM image that is not indicated by associated metadata. For example, particles in FIM images may be initially classified by the machine learning module 110C as being an SVP (or a specific SVP type) or a non-SVP. Additionally, or in the alternative, the initial classification and/or location of each SVP and/or each non-SVP in each FIM image may be indicated by associated metadata. Non-SVPs in the FIM images, once detected/classified, may be disregarded, while SVPs in the FIM images may be further classified/identified by type (e.g., protein or silicon). For example, as further described herein, the machine learning module 110C may be configured (e.g., trained) to classify SVPs in FIM images based on features indicative of a type of each SVP. The classification may be a binary classification, such as "protein or not protein," "silicon or not silicon," "protein or fiber," etc., or a multi-class classification, such as "silicon, or air bubble, or glass shard," etc. The classification may comprise a score or a level of confidence that the corresponding SVP is a particular type (e.g., 90% confidence that the SVP is a protein particle). Other examples are possible as well.

Figures 4A, 4B:
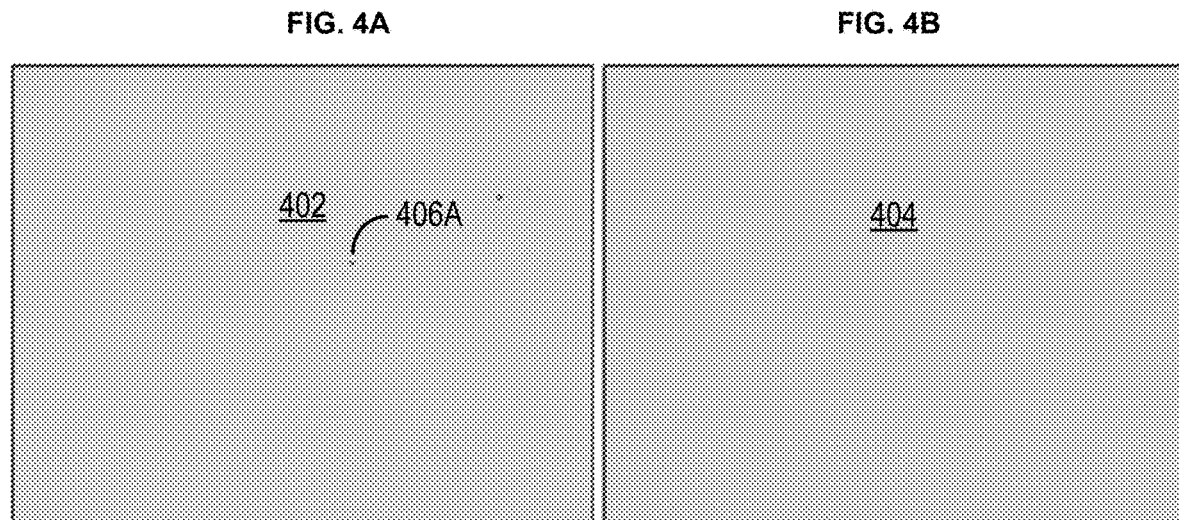
FIG. 4A shows an example image.
FIG. 4B shows an example image.

Example FIM images are shown in FIGS. 3A-4B. FIGS. 3A and 3B show example FIM images 302 and 304. Each of the FIM images 302 and 304 comprise protein SVPs 302A and 304A, respectively, that may be classified by the machine learning module 110C using the methods further described herein. FIGS. 4A and 4B show example FIM images 402 and 404. The FIM image 404 may not comprise any detectable SVPs. However, the FIM image 402 may comprise one or more silicon SVPs 406A, which may be classified by the machine learning module 110C using the methods further described herein.

Figures 5A, 5B:
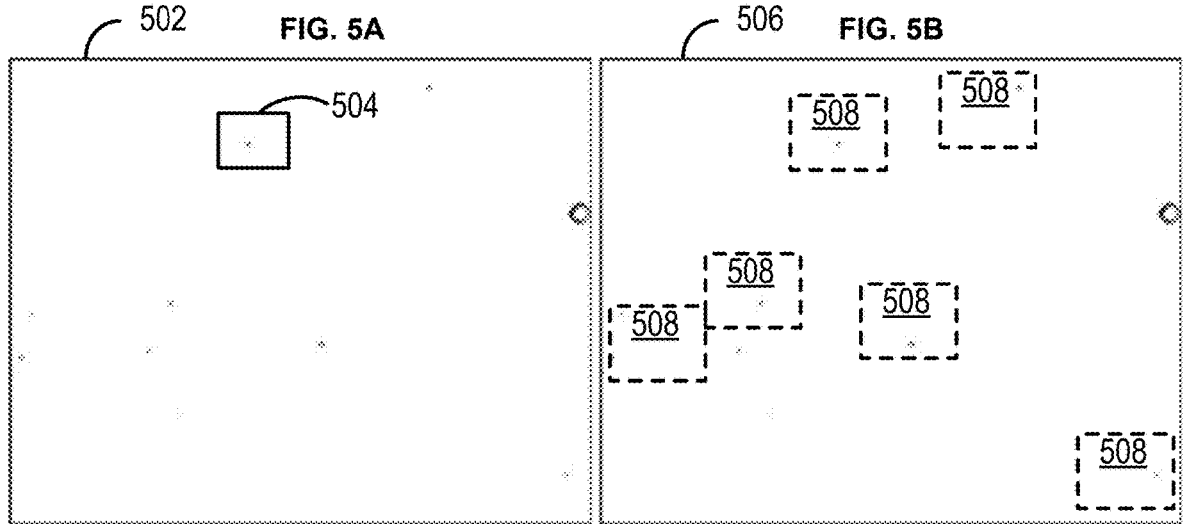
FIG. 5A shows an example image.
FIG. 5B shows an example image.

The machine learning module 110C may be configured to detect SVPs in FIM images using at least one filter, as further described herein. The at least one filter may be considered as a "sliding window" that views/analyzes each FIM image one portion at a time. FIG. 5A shows an example FIM image 502 and a sliding window 504 (e.g., the at least one filter). The machine learning module 110C may use the sliding window 504 to traverse the FIM image 502 and classify SVPs that may be present in each portion of the FIM image 502. For example, the machine learning module 110C may cause the image processing module 110B to analyze the FIM image 502 using the sliding window 504 and one or more segmentation algorithms/techniques to detect a plurality of SVPs within a plurality of regions of the FIM image 502. As another example, the machine learning module 110C may use metadata associated with the FIM image 502 to cause the image processing module 110B to analyze a particular portion(s) of the FIM image 502 using the sliding window 504. The particular portion(s) of the FIM image 502 may (or may not) be indicated by the metadata and may correspond to a location of an SVP.

An example result of the image processing module 110B analyzing the FIM image 502 using the sliding window 504 is shown as an output image 506 in FIG. 5B. The image processing module 110B may generate the output image 506 by analyzing a portion of the FIM image 502 within a current position of the sliding window 504. For example, the sliding window 504 may start at a corner of the FIM image 502 and output an indication of any SVPs within that region of the FIM image 502. The classification may include an indication of a presence and/or a type of the SVP. The sliding window 504 may "loop" or "traverse" each portion of the FIM image 502 and indicate regions 508 where SVPs are present.

In some examples, cropped images comprising each of the regions 508 may be generated by the image processing module 110B and stored by the storage module 110A for further analysis by the machine learning module 110C (e.g., classification of SVP type). In other examples, annotated/labeled images comprising each of the regions 508 may be generated by the image processing module 110B and stored by the storage module 110A for further analysis by the machine learning module 110C (e.g., classification of SVP type).

Figure 6:
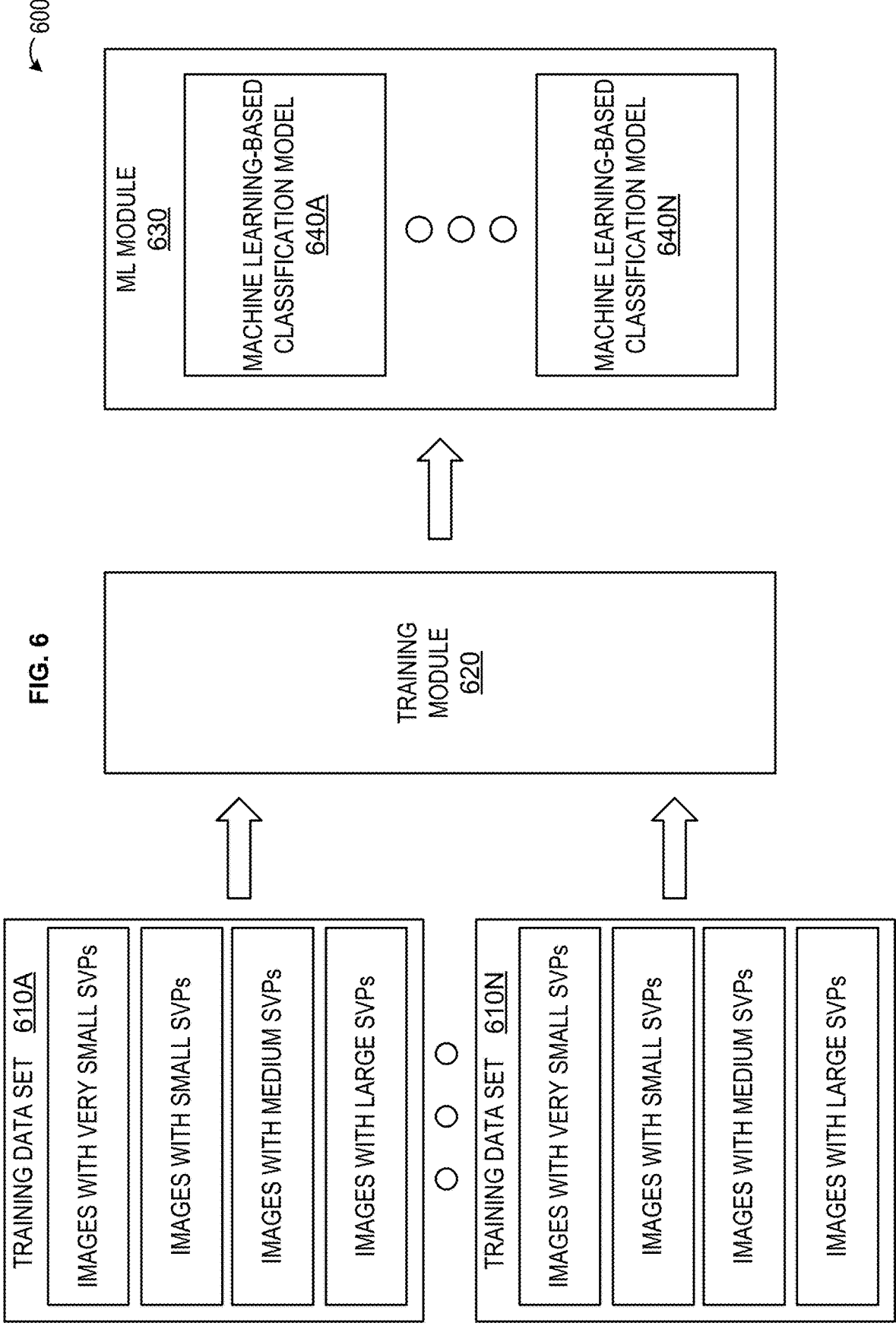
FIG. 6 shows an example system.

Turning now to FIG. 6, a system 600 for training a machine learning module 630 is shown. The machine learning module 630 may comprise the machine learning module 110C. The machine learning module 630 may be trained by a training module 620 of the system 600 to classify SVPs within FIM images. For example, the training module 620 may use machine learning ("ML") techniques to train, based on an analysis of one or more training datasets 610, the ML module 630. In some examples, before training on the training dataset 610, at least one parameter of the machine learning module 630, such as a batch size, a dropout rate, a number of epochs, a kernel size, strides, paddings, etc., may be initialized with a value for that at least one parameter associated with another machine learning module (e.g., another ML model, another CNN(s), etc.) that was trained on another training dataset (e.g., "transfer learning").

The training dataset 610 may comprise any number of datasets or subsets 610-610N. For example, the training dataset 610 may comprise a first training dataset 610A and a second training dataset 610B. The first training dataset 610A may comprise a first plurality of FIM images. As shown in FIG. 6, the first training dataset 610A (e.g., the first plurality of FIM images) may comprise a plurality of SVP sizes (e.g., from very small ECD to large ECD). In some examples, each FIM image in the first plurality of FIM images may comprise only one SVP and/or only one SVP type and/or only one SVP size. In other examples, the first plurality of FIM images may each comprise a plurality of SVPs and/or a plurality of SVP types and/or a plurality of SVP sizes. The second training dataset 610B may comprise a second plurality of FIM images. The second plurality of FIM images may comprise a plurality of SVP sizes (e.g., from very small to large ECD), which may or may not differ from the sizes in the first plurality of FIM images. In some examples, each FIM image in the second plurality of FIM images may comprise only one SVP and/or only one SVP type and/or only one SVP size. In other examples, the second plurality of FIM images may each comprise a plurality of SVPs and/or a plurality of SVP types and/or a plurality of SVP sizes.

A subset of one or both of the first training dataset 610B or the second training dataset 610B may be randomly assigned to a testing dataset. In some implementations, the assignment to a testing dataset may not be completely random. In this case, one or more criteria may be used during the assignment. In general, any suitable method may be used to assign data to the testing dataset, while ensuring that the distributions of FIM images comprising certain sizes and/or types of SVPs are properly assigned for training and testing purposes.

The training module 620 may train the ML module 630 by extracting a feature set from the FIM images in the training datasets 610 according to one or more feature selection techniques. For example, the training module 620 may train the ML module 630 by extracting a feature set from the training datasets 610 that includes statistically significant features. The training module 620 may extract a feature set from the training datasets 610 in a variety of ways. The training module 620 may perform feature extraction multiple times, each time using a different feature-extraction technique. In an example, the feature sets generated using the different techniques may each be used to generate different machine learning-based classification models 640A-640N. For example, the feature set with the highest quality metrics may be selected for use in training. The training module 620 may use the feature set(s) to build one or more machine learning-based classification models 640A-640N that are configured to classify a variety of SVPs.

The training datasets 610 may be analyzed to determine any dependencies, associations, and/or correlations between determined features in unlabeled FIM images (e.g., those not indicating SVP type and/or presence) and the features of labeled FIM images in the training dataset 610. The identified correlations may have the form of a list of features. The term "feature," as used herein, may refer to any characteristic of an item of data that may be used to determine whether the item of data falls within one or more specific categories. A feature selection technique may comprise one or more feature selection rules. The one or more feature selection rules may comprise a feature occurrence rule. The feature occurrence rule may comprise determining which features in the training dataset 610 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training datasets 610 to generate a first list of features. A final list of features may be analyzed according to additional feature selection techniques to determine one or more feature groups (e.g., groups of features that may be used to classify SVPs). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable.

As another example, one or more feature groups may be selected according to a wrapper method. A wrapper method may be configured to use a subset of features and train the ML module 630 using the subset of features. Based on the inferences that drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more feature groups. Forward feature selection is an iterative method that begins with no feature in the corresponding machine learning model. In each iteration, the feature which best improves the model is added until an addition of a new variable does not improve the performance of the machine learning model. As an example, backward elimination may be used to identify one or more feature groups. Backward elimination is an iterative method that begins with all features in the machine learning model. In each iteration, the least significant feature is removed until no improvement is observed on removal of features. Recursive feature elimination may be used to identify one or more feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 620 has generated a feature set(s), the training module 620 may generate a machine learning-based classification model 640 based on the feature set(s). A machine learning-based classification model may refer to a complex mathematical model for data classification that is generated using machine-learning techniques. In one example, the machine learning-based classification model 640 may include a map of support vectors that represent boundary features. By way of example, boundary features may be selected from, and/or represent the highest-ranked features in, a feature set. The training module 620 may use the feature sets determined or extracted from the training dataset 610 to build the machine learning-based classification models 640A-640N. In some examples, the machine learning-based classification models 640A-640N may be combined into a single machine learning-based classification model 640. Similarly, the ML module 630 may represent a single classifier containing a single or a plurality of machine learning-based classification models 640 and/or multiple classifiers containing a single or a plurality of machine learning-based classification models 640.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 630 may comprise a decision rule or a mapping for each feature of each FIM image in the training datasets 610 that may be used to classify SVPs in other FIM images. In an embodiment, the training module 620 may train the machine learning-based classification models 640 as a convolutional neural network (CNN), which is further described herein with respect to FIG. 8.

The feature(s) and the ML module 630 may be used to detect and/or to classify SVPs in FIM images in the testing data set. In one example, the prediction/result for each detected/classified SVP includes a confidence level that corresponds to a likelihood or a probability that each feature derived is associated with the particular SVP type and/or size. The confidence level may be a value between zero and one. In one example, when there are two statuses (e.g., SVP or no SVP; SVP type A vs. type B, etc.), the confidence level may correspond to a value p, which refers to a likelihood that a particular detected/classified SVP is indeed an SVP. In this case, the value 1−p may refer to a likelihood that the particular detected/classified SVP belongs to the second status (e.g., not actually an SVP). In general, multiple confidence levels may be provided for each detected/classified SVP in the testing data set and for each feature when there are more than two statuses.

Figure 7:
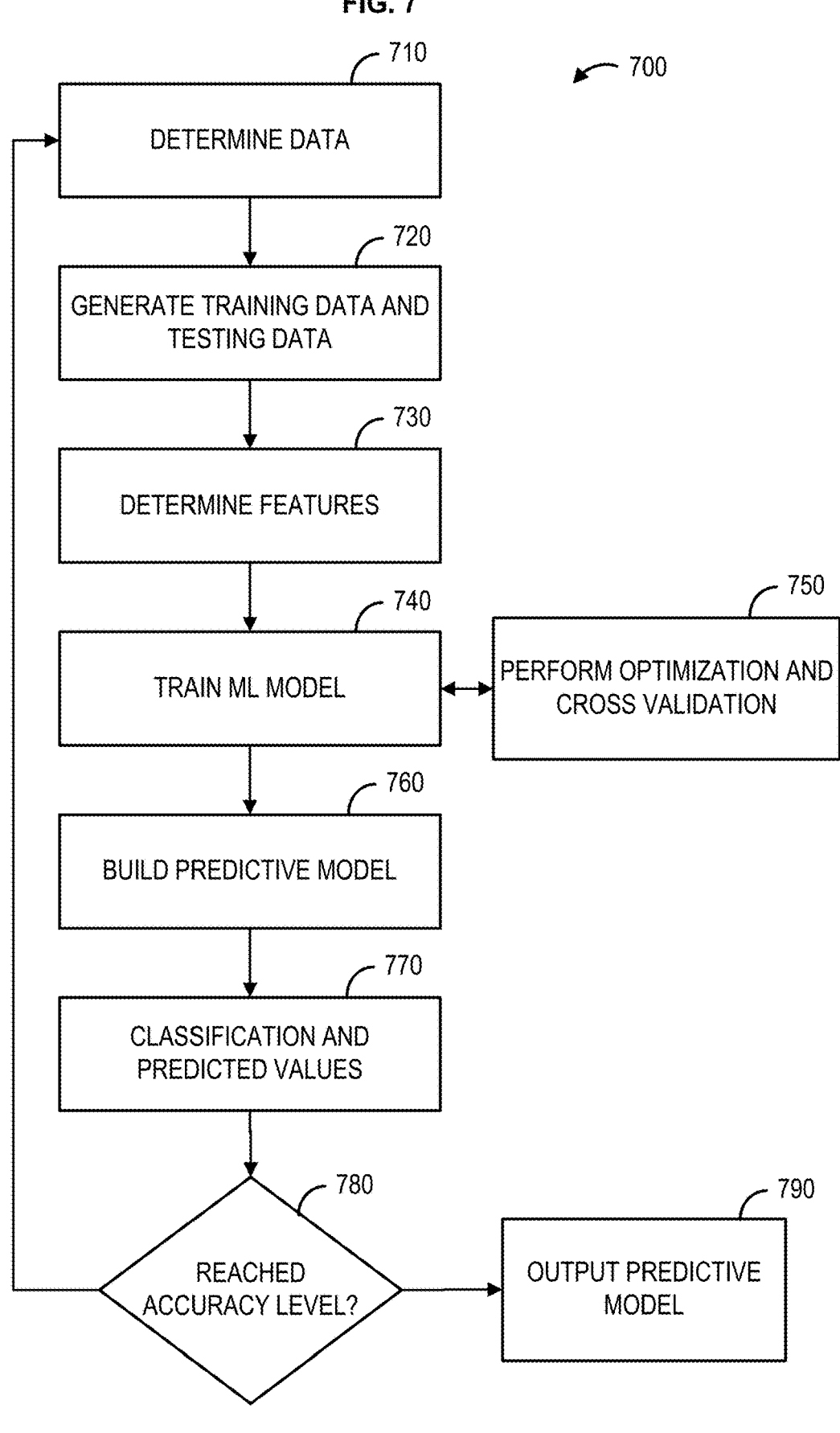
FIG. 7 shows an example training workflow.

FIG. 7 is a flowchart illustrating an example training method 700 for generating the ML module 630 using the training module 620. The training module 620 can implement supervised, unsupervised, and/or semi-supervised (e.g., reinforcement based) machine learning-based classification models 640. The method 700 illustrated in FIG. 7 is an example of a supervised learning method; variations of this example of training method are discussed below, however, other training methods can be analogously implemented to train unsupervised and/or semi-supervised machine learning models. The training method 700 may determine (e.g., access, receive, retrieve, etc.) data at step 710. The data may comprise FIM images and associated metadata. It is to be understood that, in some examples, the data may not include the metadata, and the training described herein may not use corresponding metadata.

The training method 700 may generate, at step 720, a training dataset and a testing data set. The training dataset and the testing data set may be generated by randomly assigning FIM images (or a portion(s) thereof) to either the training dataset or the testing data set. In some implementations, the assignment of FIM images (or a portion(s) thereof) as training or testing data may not be completely random. As an example, a majority of the FIM images (or a portion(s) thereof) may be used to generate the training dataset. For example, 75% of the FIM images (or a portion (s) thereof) may be used to generate the training dataset and 25% may be used to generate the testing data set. In another example, 80% of the FIM images (or a portion(s) thereof)

may be used to generate the training dataset and 20% may be used to generate the testing data set.

The training method 700 may determine (e.g., extract, select, etc.), at step 730, one or more features that can be used by, for example, a classifier to differentiate among different classification of detected SVPs. As an example, the training method 700 may determine a set of features from the FIM images (or a portion(s) thereof). In a further example, a set of features may be determined from data that is different than the FIM images (or a portion(s) thereof) in either the training dataset or the testing data set. Such FIM images (or a portion(s) thereof) may be used to determine an initial set of features, which may be further reduced using the training dataset.

The training method 700 may train one or more machine learning models using the one or more features at step 740. In one example, the machine learning models may be trained using supervised learning. In another example, other machine learning techniques may be employed, including unsupervised learning and semi-supervised. The machine learning models trained at 740 may be selected based on different criteria depending on the problem to be solved and/or data available in the training dataset. For example, machine learning classifiers can suffer from different degrees of bias. Accordingly, more than one machine learning model can be trained at 740, optimized, improved, and cross-validated at step 750.

The training method 700 may select one or more machine learning models to build a predictive model at 760. The predictive model may be evaluated using the testing data set. The predictive model may analyze the testing data set and generate predicted SVPs present in the FIM images (or a portion(s) thereof) at step 770. Predicted SVPs present in the FIM images (or a portion(s) thereof) may be evaluated at step 780 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a particle in an FIM image as being an SVP (or a specific SVP type) that was in reality not an SVP (or not the specific SVP type). Conversely, the false negatives of the predictive model may refer to a number of times the machine learning model classified a particle in an FIM image as not being an SVP when, in fact, the particle was indeed a true SVP. True negatives and true positives may refer to a number of times the predictive model correctly classified one or more particles in one or more FIM images as being an SVP (or a specific SVP type). Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 630) may be output at step 790. When the desired accuracy level is not reached, then a subsequent iteration of the training method 700 may be performed starting at step 710 with variations such as, for example, considering a larger collection of FIM images.

As described herein, the training module 620 may train the machine learning-based classification models 640, which may comprise a convolutional neural network (CNN). FIG.

Figure 8:
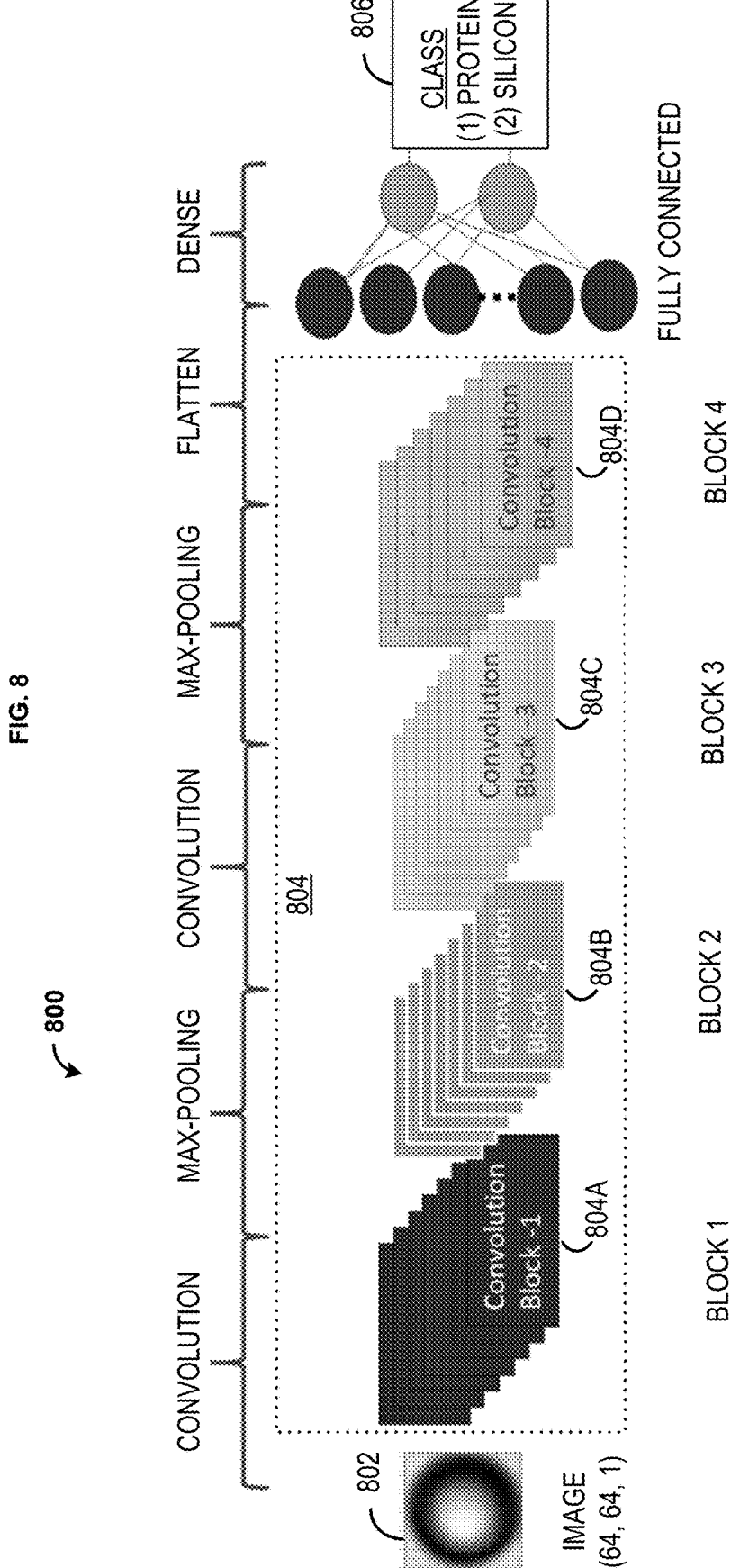
FIG. 8 shows an example convolutional neural network.

8 shows an example neural network architecture 800 of the CNN. Each of the machine learning-based classification models 640 may comprise a deep-learning model comprising one or more portions of the neural network architecture 800. The neural network architecture 800 may perform feature extraction, as described herein, on a plurality of FIM images using a set of convolutional operations, which may comprise is a series of filters that are used to filter each image. The neural network architecture 800 may perform of a number of convolutional operations (e.g., feature extraction operations). The components of the neural network architecture 800 shown in FIG. 8 are meant to be exemplary only. The neural network architecture 800 may include additional components and/or layers other than those shown in FIG. 8, as one skilled in the art may appreciate.

The neural network architecture 800 may comprise a plurality of blocks 804A-804D that may each comprise a number of operations performed on an input FIM image 802 (e.g., an FIM image as described above). The operations performed on the input FIM image 802 may include, for example, a Convolution2D (Conv2D) or SeparableConvolution2D operation followed by zero or more operations (e.g., Pooling, Dropout, Activation, Normalization, BatchNormalization, other operations, or a combination thereof), until another convolutional layer, a Dropout operation, a Flatten Operation, a Dense layer, or an output of the neural network architecture 800 is reached. A Dense layer may comprise a group of operations or layers starting with a Dense operation (e.g., a fully connected layer) followed by zero or more operations (e.g., Pooling, Dropout, Activation, Normalization, BatchNormalization, other operations, or a combination thereof) until another convolution layer, another Dense layer, or the output of the network is reached. A boundary between feature extraction based on convolutional layers and a feature classification using Dense operations may be indicated by a Flatten operation, which may "flatten" a multidimensional matrix generated using feature extraction techniques into a vector.

The neural network architecture 800 may comprise a plurality of hidden layers, ranging from as few as one hidden layer up to four hidden layers. One or more of the plurality of hidden layers may comprise the at least one filter described herein (e.g., the sliding window 504). The at least one filter may comprise, for example, a size of 3×3 pixels. The at least one filter may be applied to the input FIM image 802. In some examples, the input FIM image 802 may be preprocessed prior to being provided to the neural network architecture 800. For example, the input FIM image 802 may be resized to a uniform size, such as 64×64 pixels. Other examples are possible as well. The at least one filter may be applied to the resized input FIM image 802.

The neural network architecture 800 may comprise a plurality of hyperparameters and at least one activation function at each block of the plurality of blocks 804A-804D. The plurality of hyperparameters may comprise, for example, a batch size, a dropout rate, a number of epochs, kernel size, strides, paddings, etc. The at least one activation function may comprise, for example, a rectified linear units activation function or a hyperbolic tangent activation function. Example values for each of the plurality of hyperparameters are provided below and elsewhere herein; however, it is to be understood that those values—as well as the particular hyperparameters used—may vary in implementation. That is, the values for, and selection of, the plurality of hyperparameters discussed herein are meant to be exemplary only and not restrictive.

The input FIM image 802 may be resized before it is processed. As described herein, the input FIM image 802 may be resized to 64×64 pixels. At each block of the plurality of blocks 804A-804D, the input FIM image 802 may be processed according to a particular kernel size (e.g., a number of pixels). For example, as shown in FIG. 8, the first block 804A may comprise 64 convolution filters, a kernel size of "3" with padding having a same value, and a rectified linear units (RELU) activation function. The input FIM image 802 may then pass to the second block 804B, which may comprise one or more pooling operations, such as a MaxPooling2D operation, and a stride operation. The input FIM image 802 may then pass to the third block 804C, which may comprise a BatchNormalization operation. The BatchNormalization operation may standardize the input FIM image 802 as it is passed to through each block, which may accelerate training of the neural network architecture 800 and reduce generalization errors. For example, at the third block 804C, the input FIM image 802 may pass through a Dropout layer that may apply a rate of dropout (e.g., 0.15) to prevent overfitting.

In some examples, the network architecture 800 may comprise a Flatten layer and/or a Dense layer that may receive output features that are determined as a result of passing the input FIM image 802 through the plurality of blocks 804A-804D of the network architecture 800. The output features may comprise a plurality of SVP features derived from the input FIM image 802 and/or from training the network architecture 800. The Flatten layer may determine/generate an N-dimensional array based on the output features. The array may passed to a final layer(s) of the neural network architecture 800. For example, the array may then be passed through one or more Dense layers and/or a second Dropout layer.

The input FIM image 802 may be passed through a number of convolution filters at each block of the plurality of blocks 804A-804D, and an output 806 may then be provided. The output 806 may comprise an indication of a type (e.g., silicon or protein) and/or a size (e.g., ECD size) of each SVP detected and classified in the input FIM image 802. The output 806 may comprise a binary classification (e.g., "SVP/not SVP"), a multi-class classification (e.g. "Air Bubble, Fiber, or Glass Shard"), a percentage (e.g., 70% confidence of SVP type A and/or size A), a numerical value (e.g., 0.7), a combination thereof, and/or the like.

Figure 9:
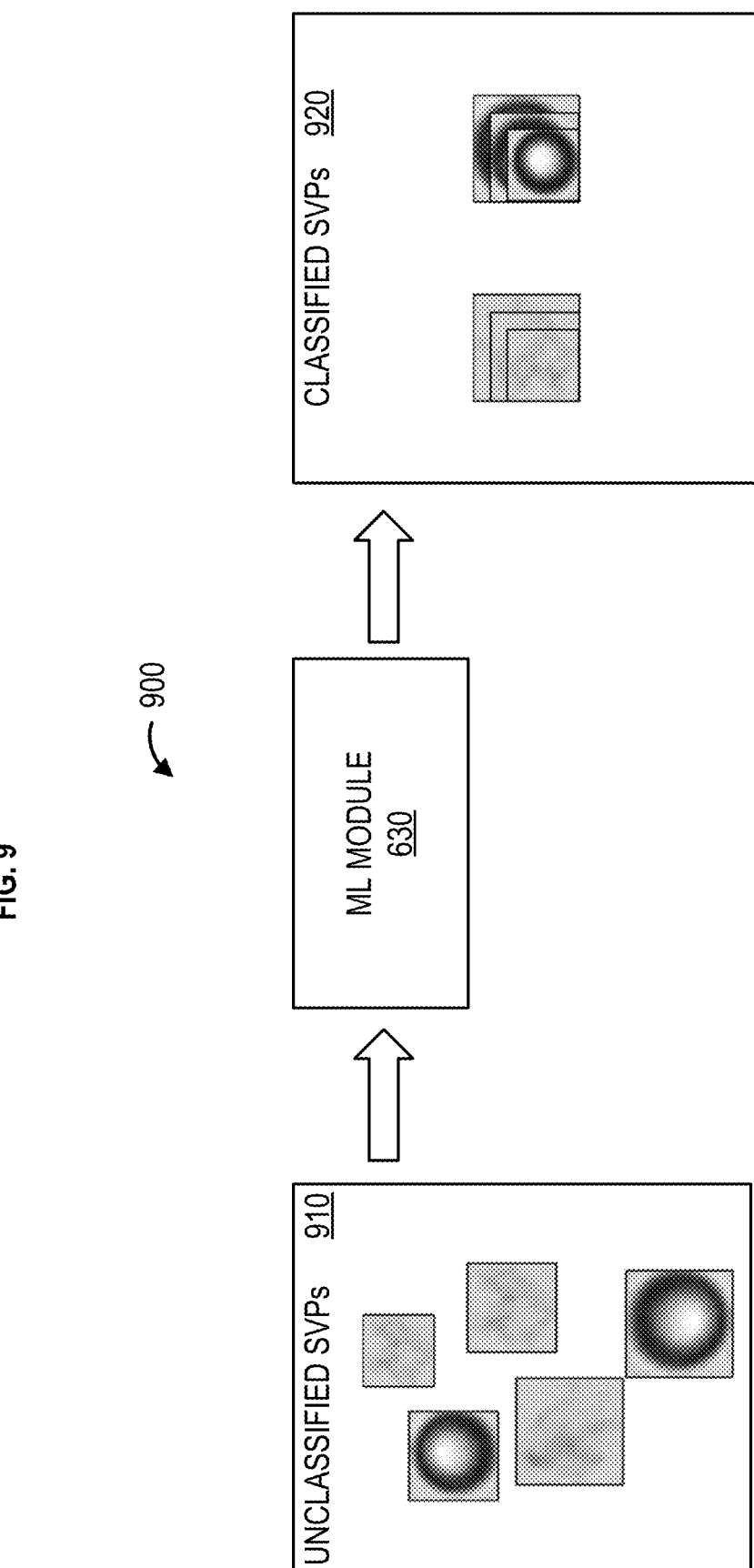
FIG. 9 shows an example classification workflow.

FIG. 9 shows an illustration of an exemplary process flow 900 for using a trained machine learning-based classifier, such as the ML module 630, to classify one or more SVPs in FIM images. As an example, as shown in FIG. 9, FIM images comprising unclassified SVPs may be provided as input to the ML module 630. The ML module 630 may process the FIM images using the methods described herein to arrive at an output 920 comprising one or more classified SVPs. The output 920 may identify one or more characteristics of the SVPs. For example, the output 920 may identify a type and/or a size of each classified SVP.

FIG. 10 shows a table of statistics for an example dataset that may be used to train and test the one or more machine learning models described herein, such as the ML module 630. The dataset may comprise a total of 7,500 labeled SVPs (silicon and protein). As shown in FIG. 10, the dataset may comprise FIM images containing SVPs ranging from "very small" ECD to "large" ECD. As described above, a subset of one or both of the first training dataset 610B or the second training dataset 610B may be randomly assigned to a testing dataset. This subset may correspond to the "Testing Set"

shown FIG. 10, which may comprise 20% of the dataset. The remaining 80% of the dataset may be used for training as described herein.

FIG. 11 shows a table of parameters for training the one or more machine learning models described herein. The table shown in FIG. 11 corresponds to a series of Experiments that were performed using the neural network architecture 800 to determine the optimal parameters for the one or more machine learning models described herein. These Experiments are labeled in the first column of the table shown in FIG. 11 with corresponding Batch Sizes, Dropout Rates, Activation Function, and Cross-Validation Scores for each experiment. The Cross-Validation scores shown in FIG. 11 may correspond to the cross-validation step 750 of the training method 700 described herein.

For some of these Experiments, the neural network architecture 800 comprised three hidden layers and focused on tuning the hyperparameters of the model (e.g., Batch Size, epochs, Dropout Rate, strides/padding, and filter counts) and the best Activation Function to use by each of the plurality of blocks 804A-804D of the neural network architecture 800. As shown in FIG. 11, the Batch Size used ranged from 64-128. The effect of a given Batch Size depended on the corresponding number of training epochs used by the neural network architecture 800. On average, the best accuracy was derived from using a smaller Batch Size over many epochs, which can be seen in the Cross-Validation scores shown in the table.

In the sample experiment illustrated in FIG. 11, epoch effects depended on the Batch Size and Dropout Rate. In general, even few training epochs produced high accuracy given a large Batch Size and a significant Dropout Rate. The effect of a given Dropout Rate depended strongly upon the number of training epochs. Given sufficient training time, the ideal Dropout Rate was determined to be approximately 15%. In general, adjusting the Dropout Rate produced the highest performance improvements following the second hidden layer of the neural network architecture 800. The number of strides and padding largely did not affect performance of the neural network architecture 800 in a statistically significant way. The Activation Functions tested for use by each of the plurality of blocks 804A-804D of the neural network architecture 800 included Sigmoid (Logistic Function), Tanh (Hyperbolic Tangent), and ReLU (Rectified Linear Units). The Sigmoid Activation Function produced the lowest test accuracies (not shown in FIG. 11). The ReLU Activation Function produced the highest test accuracies, as shown in FIG. 11. The Tanh Activation Function was effective over short training cycles but was outperformed by the ReLU Activation Function over intermediate and large training cycles (e.g., epochs).

Figure 12:
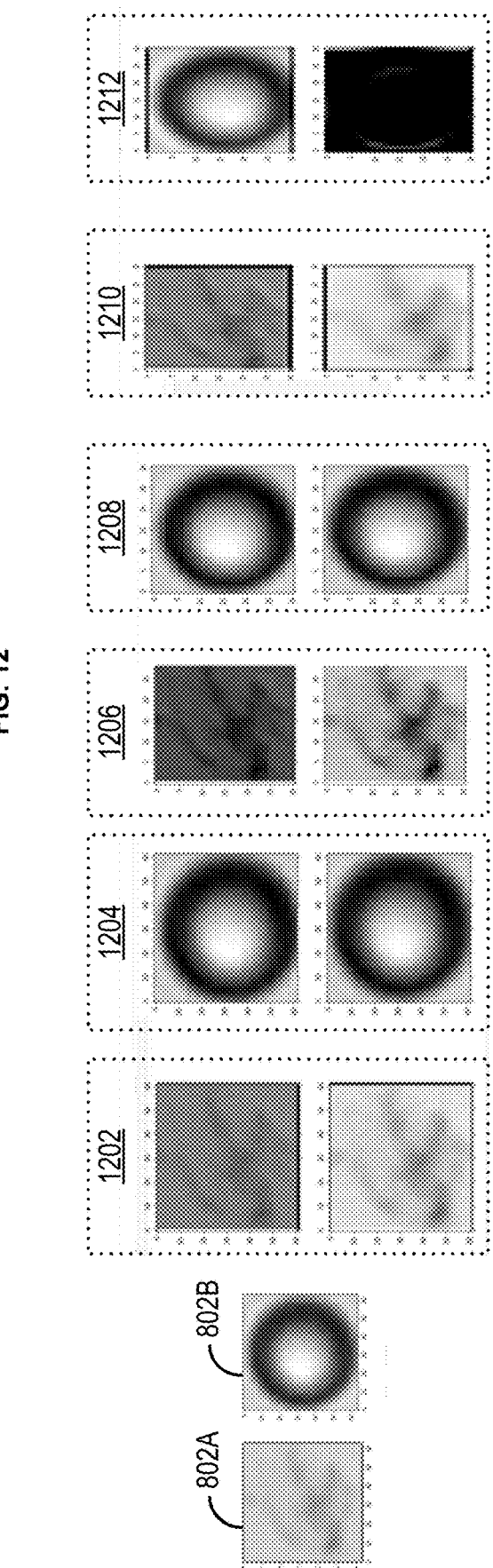
FIG. 12 shows example images and feature maps.

As described above, a plurality of output features may be determined as a result of passing the input FIM image 802 through the plurality of blocks 804A-804D of the neural network architecture 800. FIG. 12 shows example feature maps that may be generated by the neural network architecture 800. For example, a first input FIM image 802A may comprise at least one protein SVP, and the feature maps 1202, 1206, and 1210 shown in FIG. 12 correspond to output features that may be determined as a result of passing the image 802A through the plurality of blocks 804A-804D of the neural network architecture 800. As another example, a second input FIM image 802B may comprise at least one silicon SVP, and the feature maps 1204, 1208, and 1212 shown in FIG. 12 correspond to output features that may be determined as a result of passing the image 802B through the plurality of blocks 804A-804D of the neural network architecture 800.

The feature map 1202 may represent a feature map corresponding to the passing the image 802A through the first block 804A of the neural network architecture 800, while the feature map 1204 may represent a feature map corresponding to the passing the image 802B through the first block 804A of the neural network architecture 800. The feature map 1206 may represent a feature map corresponding to the passing the image 802A through the second block 804B of the neural network architecture 800, while the feature map 1208 may represent a feature map corresponding to the passing the image 802B through the second block 804B of the neural network architecture 800. The feature map 1210 may represent a feature map corresponding to the passing the image 802A through the third block 804C of the neural network architecture 800, while the feature map 1212 may represent a feature map corresponding to the passing the image 802B through the third block 804C of the neural network architecture 800.

Figure 13:
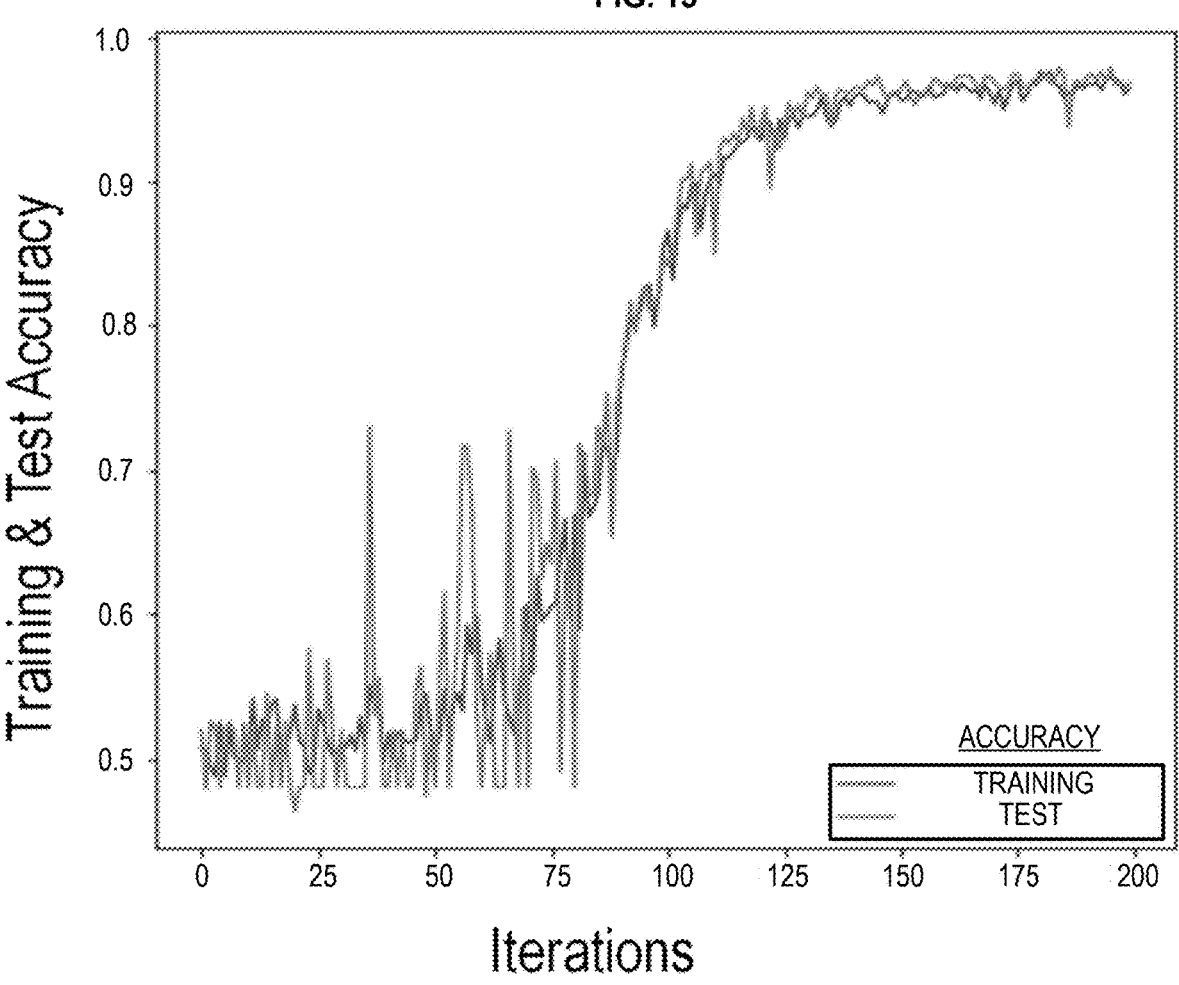
FIG. 13 shows an example graph.

Turning now to FIG. 13, a graph depicting the accuracy of the neural network architecture 800 is shown. As indicated by FIG. 13, the neural network architecture 800 becomes significantly more accurate when the number of iterations exceeds 75. As also indicated by FIG. 13, the accuracy of the neural network architecture 800 does not improve significantly after the number of iterations exceeds 150.

FIGS. 14A-14D show a series of tables depicting the accuracy of the neural network architecture 800. FIG. 14A shows the percentage accuracy based on SVP type: protein or silicon. FIG. 14B shows the percentage accuracy based on ECD size. FIG. 14C shows the percentage accuracy of the neural network architecture 800 as it relates to the Experiments and the parameters used as shown in FIG. 11, and FIG. 14D shows the percentage accuracy for the same Experiments based on ECD size.

Figure 15:
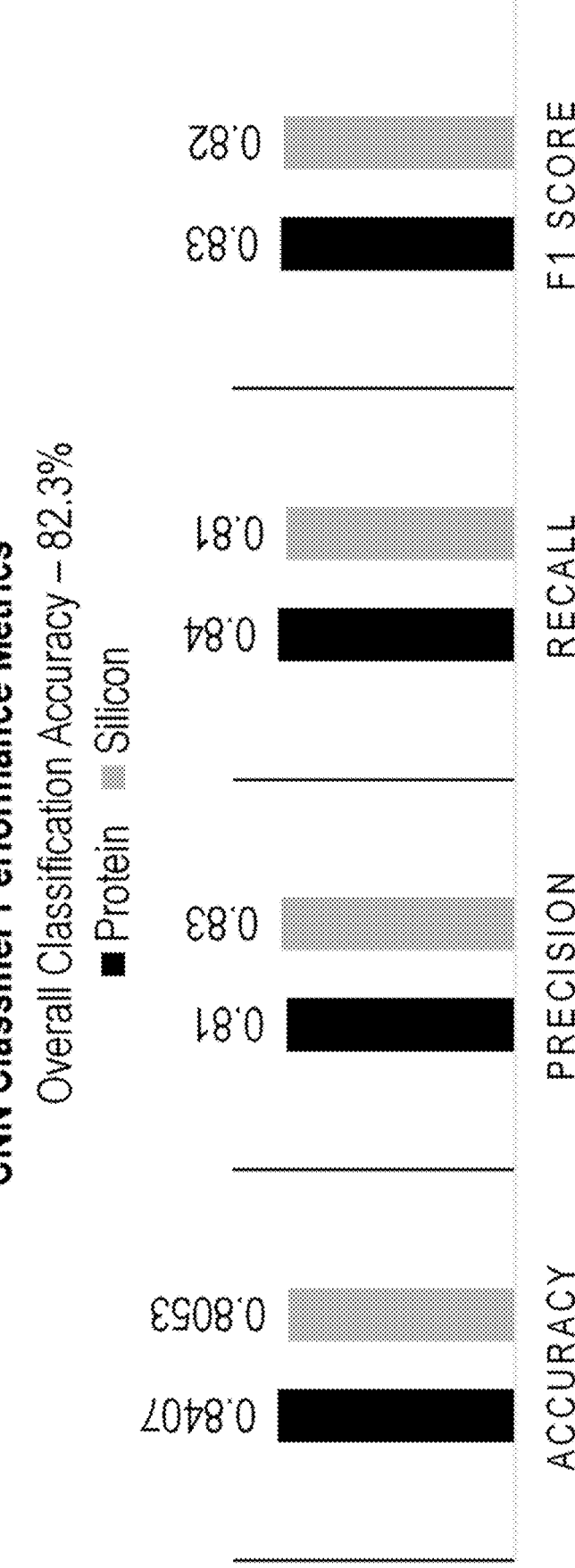
FIG. 15 shows example graphs.
Figure 16:
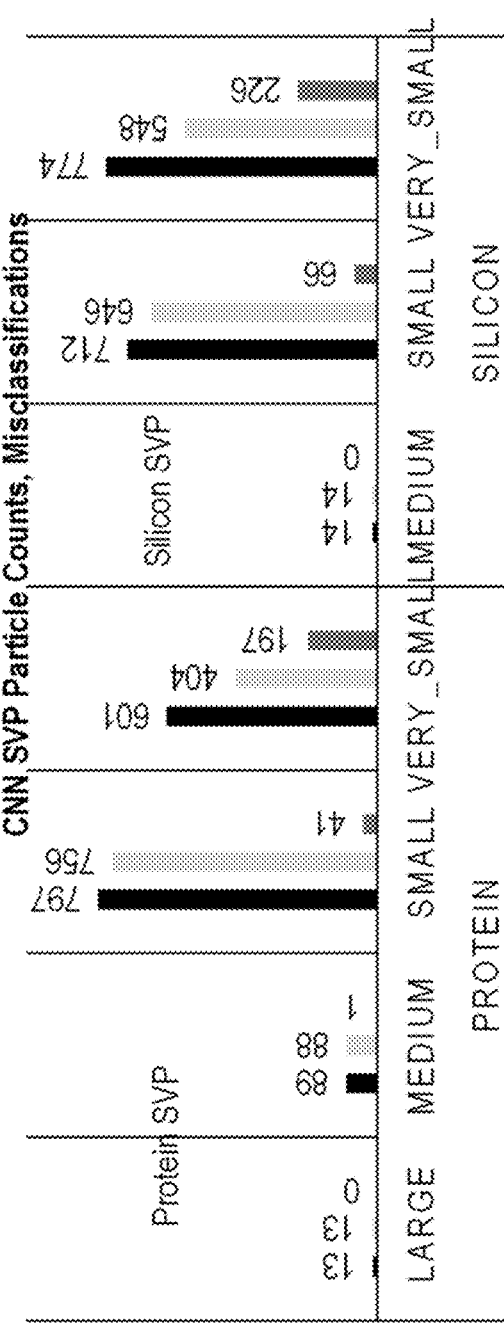
FIG. 16 shows example graphs.

FIG. 15 shows the level of accuracy, precision, recall, and F1 score of the neural network architecture 800. As shown in FIG. 15, an overall accuracy of 82.3% was achieved for classifying an SVP as being a protein particle or a silicon particle. FIG. 16 shows related statistics of performance of the neural network architecture 800 based on ECD size with respect to particle counts. As compared with current industry standards, such as using an S-Factor analysis, FIGS. 13-16 demonstrate that the neural network architecture 800 is highly capable of discriminating between SVPs.

Figure 17:
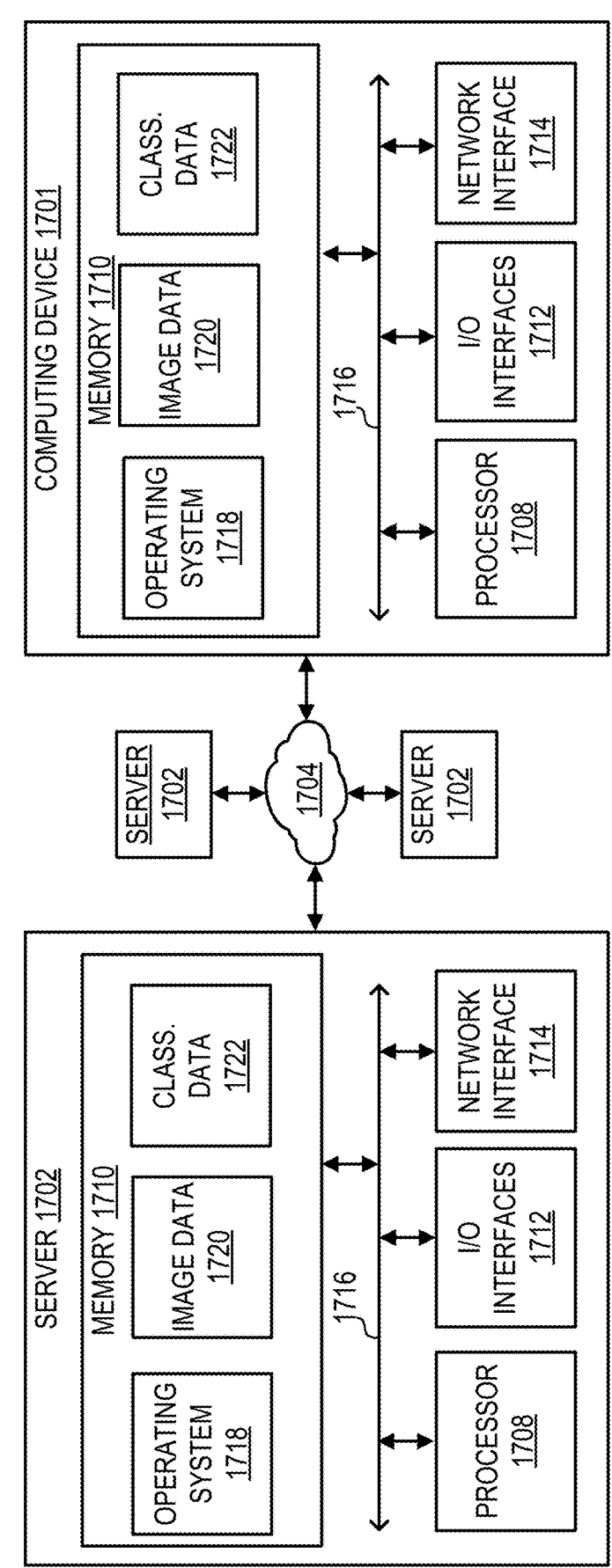
FIG. 17 shows an example system.

FIG. 17 shows a block diagram depicting an example environment 1700 for implementing the present methods and system for particle classification. The example environment 1700 as shown in FIG. 17 comprises a computing device 1701 and a server 1702 connected through a network 1704. In an aspect, some or all steps of any described method may be performed by the computing device 1701 and/or the server 1702. The computing device 1701 can comprise one or multiple computers configured to store one or more of image data 1720 and/or classification data 1722 (e.g., FIM images, related data, and the one or more machine learning models described herein). The server 1702 can comprise one or multiple computers configured to store the image data 1720 and/or the classification data 1722. Multiple servers 1702 can communicate with the computing device 1701 via the through the network 1704.

The computing device 1701 and the server 1702 may each comprise a digital computer that, in terms of hardware architecture, generally includes a processor 1708, memory system 1710, input/output (I/O) interfaces 1712, and network interfaces 1714. These components may be communicatively coupled via a local interface 1716. The local interface 1716 can be, for example, but not limited to, one or more buses or other wired or wireless connections, as is known in the art. The local interface 1716 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1708 can be a hardware device for executing software, particularly that stored in memory system 1710. The processor 1708 can be any custom made or commercially available processor, a central processing unit (CPU), an auxiliary processor among several processors associated with the computing device 1701 and the server 1702, a semiconductor-based microprocessor (in the form of a microchip or chip set), or generally any device for executing software instructions. When the computing device 1701 and/or the server 1702 is in operation, the processor 1708 can be configured to execute software stored within the memory system 1710, to communicate data to and from the memory system 1710, and to generally control operations of the computing device 1701 and the server 1702 pursuant to the software.

The I/O interfaces 1712 can be used to receive user input from, and/or for providing system output to, one or more devices or components. User input can be provided via, for example, a keyboard and/or a mouse. System output can be provided via a display device and a printer (not shown). I/O interfaces 1712 can include, for example, a serial port, a parallel port, a Small Computer System Interface (SCSI), an infrared (IR) interface, a radio frequency (RF) interface, and/or a universal serial bus (USB) interface.

The network interface 1714 can be used to transmit and receive from the computing device 1701 and/or the server 1702 on the network 1704. The network interface 1714 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 1714 may include address, control, and/or data connections to enable appropriate communications on the network 1704.

The memory system 1710 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1710 may incorporate electronic, magnetic, optical, and/or other types of storage media. Note that the memory system 1710 can have a distributed architecture, where various components are situated remote from one another, but can be accessed by the processor 1708.

The software in memory system 1710 may include one or more software programs, each of which comprises an ordered listing of executable instructions for implementing logical functions. In the example of FIG. 17, the software in the memory system 1710 of the computing device 1701 can comprise the experimental data 1720, the computationally-derived data 1722, the predictive module 1726, and a suitable operating system (O/S) 1718. In the example of FIG. 17, the software in the memory system 1710 of the server 1702 can comprise, the experimental data 1720, the computationally-derived data 1722, and a suitable operating system (O/S) 1718. The operating system 1718 essentially controls the execution of other computer programs and provides scheduling, input-output control, file and data management, memory management, and communication control and related services.

For purposes of illustration, application programs and other executable program components such as the operating system 1718 are illustrated herein as discrete blocks, although it is recognized that such programs and components can reside at various times in different storage components of the computing device 1701 and/or the server 1702. Any of the described methods herein can be stored on computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 18:
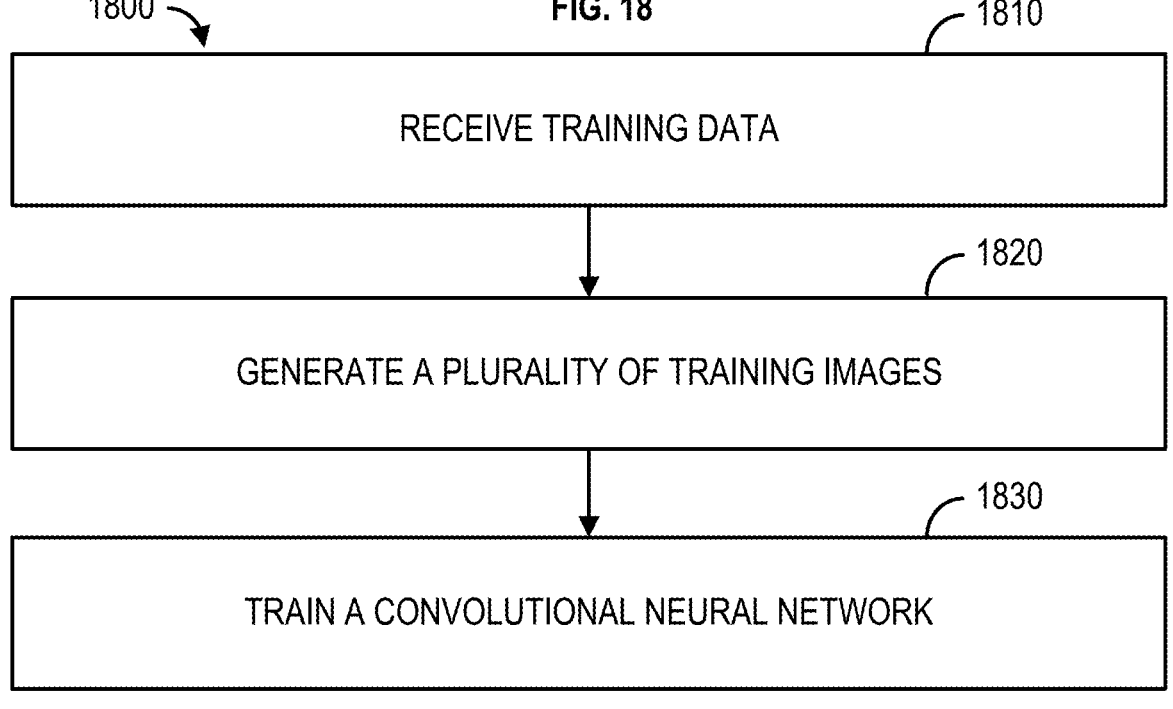
FIG. 18 shows a flowchart for an example method.

FIG. 18 shows a flowchart of an example method 1800 for particle classification. Steps of the method 1800 may be performed in whole or in part by a single computing device, a plurality of computing devices, and the like. For example, the method 1800 may be performed by one or more of the devices of the system 100, such as the client device 112 via the application module 113. As another example, the method 1800 may be performed by one or more of the devices of the system 600, such as by the ML module 630. As a further example, the method 1800 may be performed by the neural network architecture 800. In still further examples, some steps of the method 1800 may be performed by one of the devices and/or systems described above, while other steps of the method 1800 may be performed by another device(s) and/or system(s).

At step 1810, a computing device may receive training data. The training data may comprise a plurality of input images, such as a plurality of flow imaging microscope images associated with a pharmaceutical product (e.g., the FIM images and/or the first training dataset 610A described herein). Each input image of the plurality of input images may comprise at least one sub-visible particle (SVP). The at least one SVP may comprise a protein particle, a silicon particle, a fiber particle, an air bubble, a glass particle, etc. The at least one SVP may comprise an equivalent circular diameter (ECD) ranging from 1.125 to 130 micrometers.

In some examples, the computing device may receive second training data. The second training data may comprise image metadata associated with the plurality of input images, such as the metadata related to the FIM images described herein (e.g., the second training dataset 610B described herein). The image metadata may comprise metadata associated with the plurality of flow imaging microscope images. The image metadata may be indicative of a location of the at least one SVP in each input image of the plurality of input images.

At step 1820, the computing device may generate a plurality of training images. For example, the computing device may generate the plurality of training images based on the plurality of input images (e.g., the images selected for training according to the training method 700). Each training image of the plurality of training images may comprise at least one SVP. Each training image of the plurality of training images may comprise a uniform size, such as a size of at least 64×64 pixels. The uniform size may be a result of pre-processing the plurality of training images as described herein.

At step 1830, the computing device may train a convolutional neural network (CNN) (e.g., the neural network architecture 800). For example, the computing device may train the CNN based on the plurality of training images. The trained CNN may be configured to classify one or more SVPs in one or more testing images as comprising a first SVP type or a second SVP type. The first SVP type may comprise protein, for example, while the second SVP type may comprise silicon. As another example, the trained CNN may be configured to classify one or more SVPs in one or more testing images as comprising a specific SVP type (e.g. Silicon, Protein, or Air Bubble). The trained CNN may comprise at least three hidden layers. Each hidden layer of the at least three hidden layers may comprise at least one filter comprising a size of at least 3×3 pixels (e.g., the sliding window 504).

Training the CNN may further comprise determining a plurality of hyperparameters. The plurality of hyperparameters may comprise one or more of: a batch size ranging from 64 to 256 or a dropout rate ranging from 5% to 50%. Training the CNN may further comprise determining an activation function. The activation function may comprise a rectified linear units activation (RELU) function or a hyperbolic tangent activation (Tanh) function.

Figure 19:
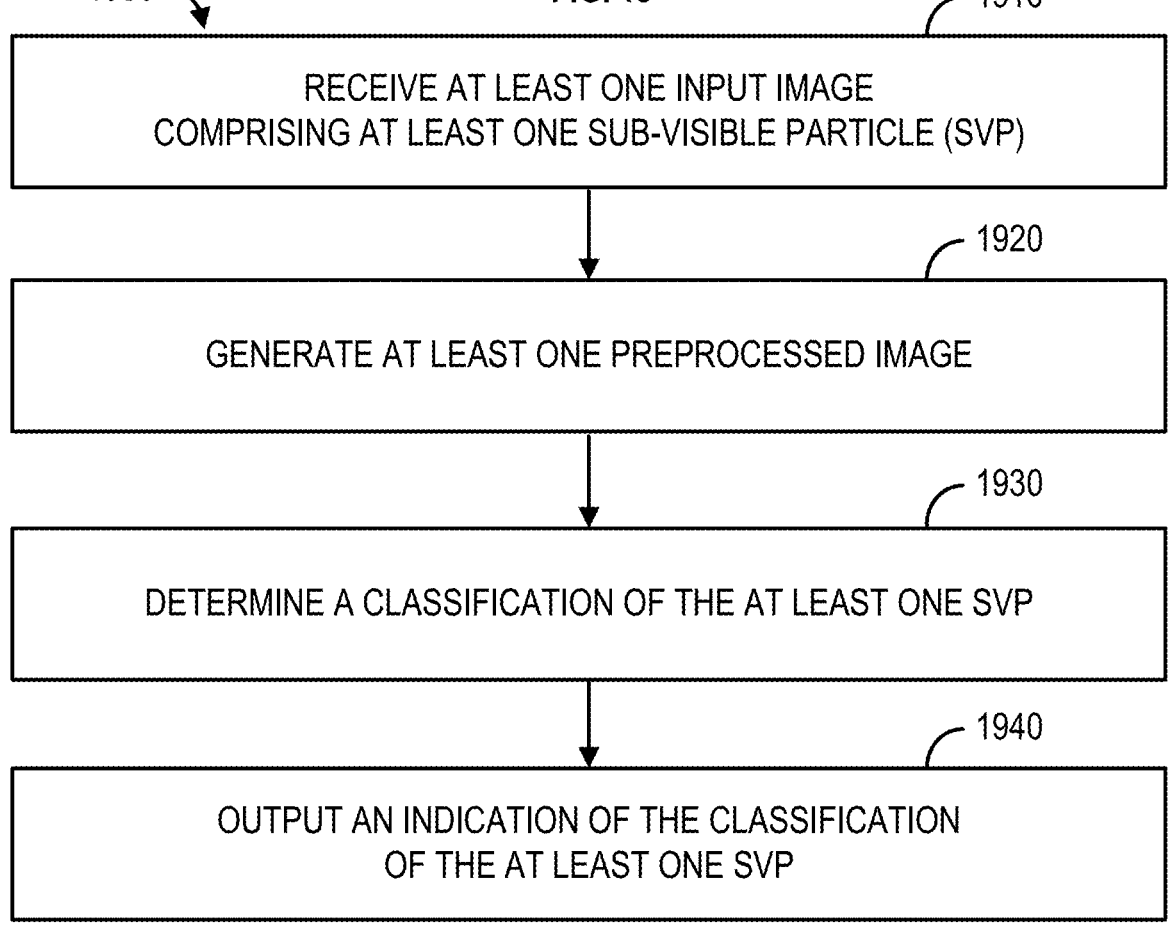
FIG. 19 shows a flowchart for an example method.

FIG. 19 shows a flowchart of an example method 1900 for particle classification. Steps of the method 1900 may be performed in whole or in part by a single computing device, a plurality of computing devices, and the like. For example, the method 1900 may be performed by one or more of the devices of the system 100, such as the client device 112 via the application module 113. As another example, the method 1900 may be performed by one or more of the devices of the system 600, such as by the ML module 630. As a further example, the method 1900 may be performed by the neural network architecture 800. In still further examples, some steps of the method 1900 may be performed by one of the devices and/or systems described above, while other steps of the method 1900 may be performed by another device(s) and/or system(s).

At step 1910, a computing device may receive at least one input image (e.g., an FIM image). The at least one input image may comprise at least one sub-visible particle (SVP). The at least one input image may comprise at least one flow imaging microscope image associated with a pharmaceutical product. In some examples, the computing device may receive image metadata associated with the at least one input image. The image metadata may comprise metadata associated with the at least one flow imaging microscope image. The image metadata may be indicative of a location of the at least one SVP.

At step 1920, the computing device may generate at least one preprocessed image. The computing device may generate the at least one preprocessed image based on the at least one input image and, in some cases, the image metadata. For example, generating the at least one preprocessed image may comprise resizing the at least one input image to at least 64×64 pixels. As another example, generating the at least one preprocessed image may comprise determining, based on at least one segmentation algorithm (e.g. agglomerative clustering, watershed transformation, etc.), the location of the at least one SVP. The computing device may use the at least one segmentation algorithm to determine the location of the at least one SVP when the image metadata does not indicate the location (or when the image metadata is not used by the method 1900). In other examples, the computing device may use the at least one segmentation algorithm to determine the location of the at least one SVP to confirm/ verify a location indicated by the image metadata.

At step 1930, the computing device may determine a classification of the at least one SVP. For example the computing device may determine a type of SVP. The computing device may determine the classification of the at least one SVP using a trained convolutional neural network (CNN), such as the neural network architecture 800. Additionally, or in the alternative, the computing device may determine the classification of the at least one SVP by passing the at least one preprocessed image through the trained CNN.

The computing device may train the CNN. For example, the computing device may train the CNN based on a plurality of training images. The trained CNN may be configured to classify one or more SVPs in one or more testing images as comprising a first SVP type or a second SVP type. The first SVP type may comprise protein, while the second SVP type may comprise silicon. The trained CNN may comprise at least three hidden layers. Each hidden layer of the at least three hidden layers may comprise at least one filter comprising a size of at least 3×3 pixels (e.g., the sliding window 504). Training the CNN may comprise determining a plurality of hyperparameters. The plurality of hyperparameters may comprise one or more of: a batch size ranging from 64 to 256 or a dropout rate ranging from 5% to 50%. Training the CNN may further comprise determining an activation function. The activation function may comprise a rectified linear units activation (RELU) function or a hyperbolic tangent activation (Tanh) function.

At step 1940, the computing device may output an indication of the classification of the at least one SVP. For example, the computing device indicate via a user interface or other mechanism that the at least one SVP comprises a protein particle. Other examples are possible as well, such as providing the indication via a message, report, etc. In still other examples, the computing device may save a data record indicating the classification of the at least one SVP.

Figure 20:
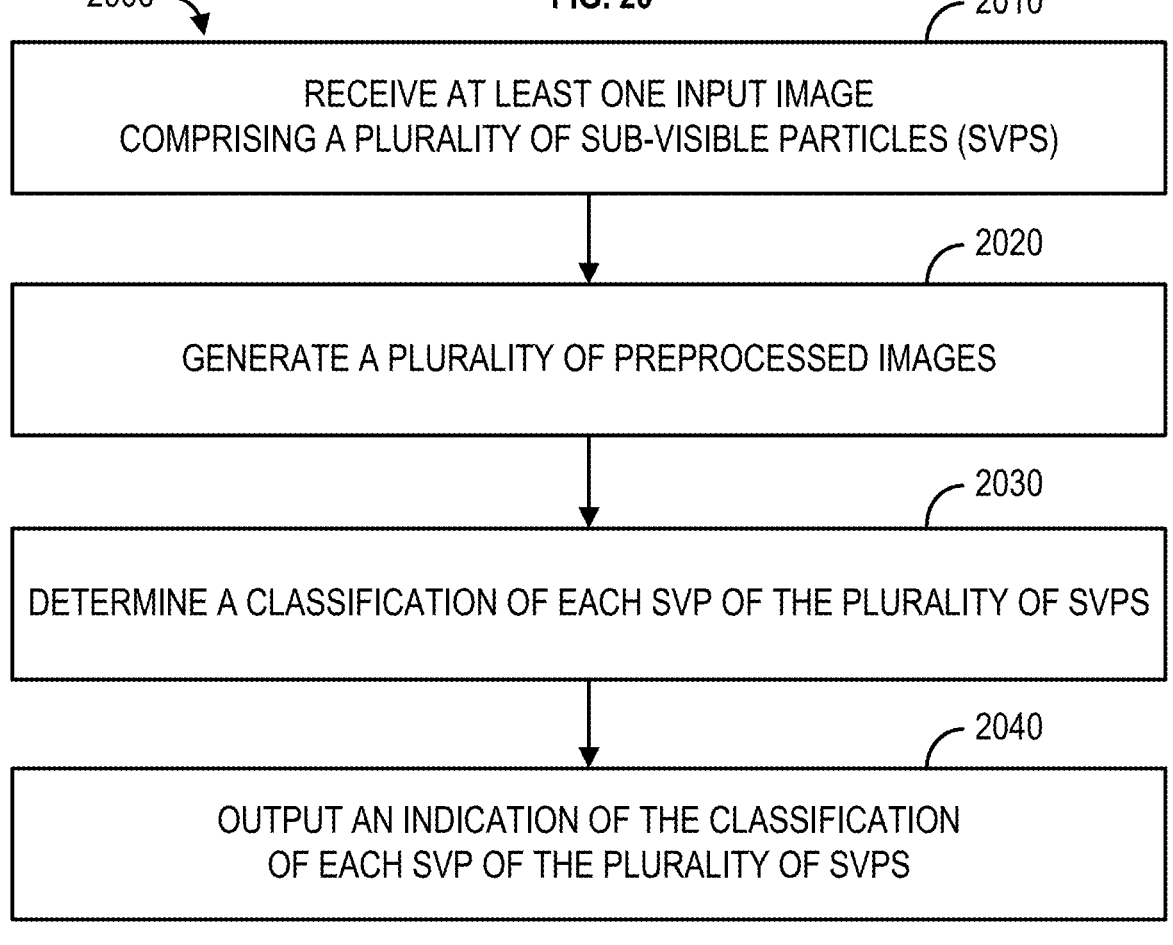
FIG. 20 shows a flowchart for an example method.

FIG. 20 shows a flowchart of an example method 2000 for particle classification. Steps of the method 2000 may be performed in whole or in part by a single computing device, a plurality of computing devices, and the like. For example, the method 2000 may be performed by one or more of the devices of the system 100, such as the client device 112 via the application module 113. As another example, the method 2000 may be performed by one or more of the devices of the system 600, such as by the ML module 630. As a further example, the method 2000 may be performed by the neural network architecture 800. In still further examples, some steps of the method 2000 may be performed by one of the devices and/or systems described above, while other steps of the method 2000 may be performed by another device(s) and/or system(s).

At step 2010, a computing device may receive at least one input image (e.g., an FIM image). The at least one input image may comprise a plurality of one sub-visible particles (SVPs). The at least one input image may comprise at least one flow imaging microscope image associated with a pharmaceutical product. In some examples, the computing device may receive image metadata associated with the at least one input image. The image metadata may comprise metadata associated with the at least one flow imaging microscope image. The image metadata may be indicative of a location of each SVP of the plurality of SVPs.

At step 2020, the computing device may generate a plurality of preprocessed images. Each preprocessed image of the plurality of preprocessed images may comprise one of the plurality of SVPs. The computing device may generate the plurality of preprocessed images based on the at least one input image. Additionally, or in the alternative, the computing device may generate the plurality of preprocessed images based on the at least one input image and the image metadata. For example, generating the plurality of preprocessed images may comprise resizing the at least one input image to at least 64×64 pixels. As another example, generating the plurality of preprocessed images may comprise determining, based on at least one segmentation algorithm (e.g. agglomerative clustering, watershed transformation, etc.), the location of each SVP of the plurality of SVPs. The computing device may use the at least one segmentation algorithm to determine the location of each SVP of the plurality of SVPs when the image metadata does not indicate the locations (or when the image metadata is not used by the method 2000). In other examples, the computing device may use the at least one segmentation algorithm to determine the location of each SVP of the plurality of SVPs to confirm/ verify a location(s) indicated by the image metadata.

At step 2030, the computing device may determine a classification of each SVP of the plurality of SVPs. For example the computing device may determine a type of each SVP of the plurality of SVPs. The computing device may determine the classification of each SVP of the plurality of SVPs using a trained convolutional neural network (CNN), such as the neural network architecture 800. Additionally, or in the alternative, the computing device may determine the classification of each SVP of the plurality of SVPs by passing each preprocessed image of the plurality of preprocessed images through the trained CNN.

At step 2040, the computing device may output an indication of the classification of each SVP of the plurality of SVPs. For example, the computing device indicate via a user interface or other mechanism the classification of each SVP of the plurality of SVPs. Other examples are possible as well, such as providing the indications via a message, report, etc. In still other examples, the computing device may save a data record(s) indicating the classification of each SVP of the plurality of SVPs.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A method comprising:
   receiving, by a computing device, training data comprising a plurality of input images, wherein each input image of the plurality of input images comprises at least one sub-visible particle (SVP);
   generating, based on the plurality of input images, a plurality of training images, wherein each training image of the plurality of training images comprises at least one SVP; and
   training, based on the plurality of training images, a convolutional neural network (CNN), wherein the trained CNN is configured to classify one or more SVPs in one or more testing images as comprising a first SVP type or a second SVP type,
   wherein the training data comprises image metadata associated with the plurality of input images, and wherein the image metadata is indicative of a location of the at least one SVP in each input image of the plurality of input images.

2. The method of claim 1, wherein the plurality of input images comprises a plurality of flow imaging microscope images associated with a pharmaceutical product.

3. The method of claim 1, wherein the image metadata associated with the plurality of input images is indicative of an initial classification of the at least one SVP.

4. The method of claim 1, wherein at least one of:
   the at least one SVP comprises a protein particle, a silicon particle, a fiber particle, an air bubble, a glass particle, or other known particle type;
   the at least one SVP comprises an equivalent circular diameter ranging from 1.125 to 130 micrometers;
   each training image of the plurality of training images comprises a size of at least 64×64 pixels;
   the first SVP type comprises protein; or
   the second SVP type comprises silicon.

5. The method of claim 1, wherein the trained CNN comprises at least three hidden layers.

6. The method of claim 5, wherein each hidden layer of the at least three hidden layers comprises at least one filter comprising a size of at least 3×3 pixels.

7. The method of claim 1, wherein training the CNN further comprises determining a plurality of hyperparameters, and wherein the plurality of hyperparameters comprises one or more of: a batch size ranging from 64 to 256 or a dropout rate ranging from 5% to 50%.

8. The method of claim 1, wherein training the CNN further comprises determining an activation function, and wherein the activation function comprises a rectified linear units activation function or a hyperbolic tangent activation function.

9. A method comprising:
   receiving, by a computing device, training data comprising at least one input image comprising at least one sub-visible particle (SVP);
   generating, based on the at least one input image, at least one preprocessed image;
   determining, by a trained convolutional neural network (CNN), based on the at least one preprocessed image, a classification of the at least one SVP; and
   outputting, by the trained CNN, an indication of the classification of the at least one SVP, wherein the training data comprises image metadata associated with the at least one input image, and wherein the image metadata is indicative of a location of the at least one SVP in each input image of the at least one input image.

10. The method of claim 9, wherein the at least one input image comprises at least one flow imaging microscope image associated with a pharmaceutical product.

11. The method of claim 9, further comprising:

verifying the location of the at least one SVP indicated in the image metadata.

12. The method of claim 9, wherein generating the at least one preprocessed image comprises at least one of:

resizing the at least one input image to at least 64×64 pixels; or determining, based on at least one segmentation algorithm a location of the at least one SVP.

13. The method of claim 9, wherein the trained CNN comprises at least three hidden layers, and wherein each hidden layer of the at least three hidden layers comprises at least one filter comprising a size of at least 3×3 pixels.

14. The method of claim 9, wherein the trained CNN comprises a plurality of hyperparameters, and wherein the plurality of hyperparameters comprises one or more of:

a batch size ranging from 64 to 256 or a dropout rate ranging from 5% to 50%.

15. The method of claim 9, wherein the trained CNN comprises an activation function and, wherein the activation function comprises a rectified linear units activation function or a hyperbolic tangent activation function.

16. A method comprising:

receiving, by a computing device, training data comprising at least one input image comprising a plurality of sub-visible particles (SVPs);

generating, based on the at least one input image, a plurality of preprocessed images, wherein each preprocessed image of the plurality of preprocessed images comprises one of the plurality of SVPs;

determining, by a trained convolutional neural network (CNN), based on the plurality of preprocessed images, a classification of each SVP of the plurality of SVPs; and outputting, by the trained CNN, an indication of the classification of each SVP of the plurality of SVPs, wherein the training data comprises image metadata associated with the at least one input image, and wherein the image metadata is indicative of a location of the at least one SVP in each input image of the at least one input image.

17. The method of claim 16, further comprising: determining, based on at least one segmentation algorithm, a location of each SVP of the plurality of SVPs.

18. The method of claim 16, wherein the at least one input image comprises at least one flow imaging microscope image associated with a pharmaceutical product.

19. The method of claim 18, further comprising:

verifying the location of the at least one SVP indicated in the image metadata, wherein the image metadata comprises metadata associated with the at least one flow imaging microscope image and is indicative of an initial classification of the at least one SVP.

20. The method of claim 16, wherein at least one of:

the plurality of SVPs comprises protein particles, silicon particles, fiber particles, air bubbles, or glass particles;

each SVP of the plurality of SVPs comprises an equivalent circular diameter ranging from 1.125 to 130 micrometers; or the CNN is trained using training image that each comprise a size of at least 64×64 pixels.

* * * * *